US011001698B2

(12) United States Patent
Hoevel et al.

(10) Patent No.: US 11,001,698 B2
(45) Date of Patent: May 11, 2021

(54) STABILIZER COMPOSITION

(71) Applicant: BASF SE, Ludwigshafen am Rhein (DE)

(72) Inventors: Bernd Hoevel, Ludwigshafen (DE); Angelika Roser, Ludwigshafen (DE); Claudia Fischer, Limburgerhof (DE)

(73) Assignee: BASF SE

( * ) Notice: Subject to any disclaimer, the term of this patent is extended or adjusted under 35 U.S.C. 154(b) by 8 days.

(21) Appl. No.: 16/341,760

(22) PCT Filed: Oct. 13, 2017

(86) PCT No.: PCT/EP2017/076250
§ 371 (c)(1),
(2) Date: Apr. 12, 2019

(87) PCT Pub. No.: WO2018/069530
PCT Pub. Date: Apr. 19, 2018

(65) Prior Publication Data
US 2020/0048431 A1 Feb. 13, 2020

(30) Foreign Application Priority Data
Oct. 14, 2016 (EP) .................................... 16194002

(51) Int. Cl.
| *C08K 5/3435* | (2006.01) |
| *C09D 7/48* | (2018.01) |
| *C09D 7/63* | (2018.01) |
| *C08K 5/092* | (2006.01) |
| *C08K 5/3492* | (2006.01) |
| *C08K 5/372* | (2006.01) |
| *C09J 11/06* | (2006.01) |

(52) U.S. Cl.
CPC ............ *C08K 5/3435* (2013.01); *C08K 5/092* (2013.01); *C08K 5/3492* (2013.01); *C08K 5/372* (2013.01); *C09D 7/48* (2018.01); *C09D 7/63* (2018.01); *C09J 11/06* (2013.01)

(58) Field of Classification Search
CPC .... C08K 5/3435; C08K 5/092; C08K 5/3492; C08K 5/372; C09D 7/48; C09D 7/63; C09J 11/06
See application file for complete search history.

(56) References Cited

U.S. PATENT DOCUMENTS

| 5,272,189 | A | 12/1993 | Kaufman |
| 5,389,219 | A | 2/1995 | Zwack et al. |
| 6,376,584 | B1 | 4/2002 | Galbo et al. |
| 2002/0051429 | A1 | 5/2002 | Ford et al. |
| 2003/0170467 | A1* | 9/2003 | Cornelius ............... G02B 5/208 428/447 |
| 2004/0249022 | A1 | 12/2004 | Su |
| 2006/0122295 | A1* | 6/2006 | Oysaed ................... C08K 5/005 524/128 |
| 2006/0197069 | A1* | 9/2006 | Capocci .................... C08K 5/32 252/609 |
| 2009/0118401 | A1 | 5/2009 | Saito et al. |
| 2011/0028611 | A1 | 2/2011 | Mizokawa et al. |
| 2012/0238695 | A1 | 9/2012 | Zander et al. |
| 2012/0316253 | A1 | 12/2012 | Saito et al. |
| 2013/0065997 | A1 | 3/2013 | Gahlmann |
| 2013/0131255 | A1* | 5/2013 | Pottie .................... C08K 5/1525 524/513 |
| 2013/0171415 | A1 | 7/2013 | Sakita et al. |
| 2013/0197141 | A1 | 8/2013 | Luckert et al. |
| 2015/0083324 | A1 | 3/2015 | Stanjek et al. |
| 2015/0315465 | A1 | 11/2015 | Gupta et al. |
| 2016/0126384 | A1* | 5/2016 | Van Aert ............... C09D 133/14 136/251 |

FOREIGN PATENT DOCUMENTS

| CA | 2262435 | A1 | 8/1999 |
| CN | 1125957 | A | 7/1996 |
| CN | 1541247 | A | 10/2004 |
| CN | 1552758 | A | 12/2004 |
| CN | 1602334 | A | 3/2005 |
| CN | 1878828 | A | 12/2006 |
| CN | 101965382 | A | 2/2011 |
| CN | 103080839 | A | 5/2013 |

(Continued)

OTHER PUBLICATIONS

International Search Report dated Dec. 12, 2017 in PCT/EP2017/076250 filed Oct. 13, 2017, 5 pages.
International Preliminary Report on Patentability and Written Opinion of the International Searching Authority dated Apr. 16, 2019 in PCT/EP2017/076250 filed Oct. 13, 2017, 11 pages.

*Primary Examiner* — John E Uselding
(74) *Attorney, Agent, or Firm* — Faegre Drinker Biddle & Reath LLP

(57) ABSTRACT

The present invention relates to a stabilizer composition containing at least one sterically hindered amine (HALS) in which the amino group carries a basicity-reducing substituent, at least one antioxidant containing one or more thioether groups and at least one liquid plasticizer containing carboxylate groups. The invention further relates to a polymer composition containing at least one sterically hindered amine (HALS) in which the amino group carries a basicity-reducing substituent, at least one antioxidant containing one or more thioether groups, at least one liquid plasticizer containing carboxylate groups and at least one silyl-terminated polymer, to the use of the stabilizer composition for stabilizing a silyl-terminated polymer or a sealant, adhesive, gasket, knifing filler or coating composition, especially a sealant, adhesive, gasket, knifing filler or coating composition containing a silyl-terminated polymer, against degradation by heat, light and/or oxygen, to the use of the polymer composition as or in a sealant, adhesive, liquid gasket, knifing filler or coating composition, and to a sealant composition or an adhesive composition, or a gasket composition, or a knifing filler composition or a coating composition comprising the polymer composition.

26 Claims, No Drawings

(56) References Cited

FOREIGN PATENT DOCUMENTS

| | | |
|---|---|---|
| CN | 104185668 A | 12/2014 |
| DE | 10 2004 018 548 A1 | 11/2005 |
| DE | 10 2011 003 425 A1 | 8/2012 |
| JP | 2002-129004 A | 5/2002 |
| JP | 2002-234996 A | 8/2002 |
| JP | 2005-290242 A | 10/2005 |
| JP | 4504068 B2 | 7/2010 |
| WO | 94/09076 A1 | 4/1994 |
| WO | 95/00594 A2 | 1/1995 |
| WO | 2002/102886 A1 | 12/2002 |
| WO | 2005/049715 A2 | 6/2005 |
| WO | WO 2016/184932 A1 | 11/2016 |

* cited by examiner

STABILIZER COMPOSITION

TECHNICAL BACKGROUND

The present invention relates to a stabilizer composition containing at least one sterically hindered amine (HALS) in which the amino group carries a basicity-reducing substituent, at least one antioxidant containing one or more thioether groups and at least one liquid plasticizer containing carboxylate groups. The invention further relates to a polymer composition containing at least one sterically hindered amine (HALS) in which the amino group carries a basicity-reducing substituent, at least one antioxidant containing one or more thioether groups, at least one liquid plasticizer containing carboxylate groups and at least one silyl-terminated polymer, to the use of the stabilizer composition for stabilizing a silyl-terminated polymer or a sealant, adhesive, gasket, knifing filler or coating composition, especially a sealant, adhesive, gasket, knifing filler or coating composition containing a silyl-terminated polymer, against degradation by heat, light and/or oxygen, to the use of the polymer composition as or in a sealant, adhesive, liquid gasket, knifing filler or coating composition, and to a sealant composition or an adhesive composition, or a gasket composition, or a knifing filler composition or a coating composition comprising the polymer composition.

Moisture-crosslinkable polymer compositions based on silyl-terminated polymers (STPs) and their use in sealants, adhesives and coating compositions are known. In the presence of atmospheric moisture, STPs with hydrolyzable substituents, such as alkoxy groups, are capable of condensing with one another yet at room temperature; resulting thus in cured or crosslinked polymers. Depending on the content of silyl groups with hydrolysable substituents and the structure of these silyl groups, mainly long-chain polymers (thermoplastics), relatively wide-mesh, three-dimensional networks (elastomers) or highly crosslinked systems (thermosets) are formed during this process.

In the present invention, the terms "curing" and "crosslinking" are used interchangeably, referring to the toughening or hardening of a polymer material by cross-linking of polymer chains.

Sealing, adhesive and coating materials are used in a wide variety of applications and materials. If transparent materials, like glass, are part of the application, light, especially UV radiation, reaches the sealing, adhesive or coating material, which makes it prone to deterioration if it is not stabilized appropriately. Non-transparent applications or applications not exposed to light may also be prone to deterioration, for example if exposed to heat, like in flooring close to heat sources, or to deterioration caused by atmospheric oxygen.

Demands relating to the long-term temperature resistance of sealants, adhesives and coating compositions are becoming ever higher. The same holds true for UV resistance and resistance against oxidation. Thus, there is a continuing need for temperature- and/or UV- and/or oxidation-resistant compositions which are suitable for use as a sealant, adhesive and/or coating composition and which additionally have beneficial and indispensable properties that are required in the area of this type of application.

US 2013/197141 relates to moisture-curable adhesive, sealant and/or coating compositions based on silane-terminated polymers and containing a phenolic compound without thioether groups and a phenolic compound with thioether groups. The phenolic compounds are to improve the temperature stability of the composition.

Phenolic compounds containing thioether groups are very efficient antioxidants. Unfortunately, however, they are often not compatible with sterically hindered amines, especially with such HALS in which the amino group interacts with sulfonic acids which are formed by the oxidation of thioether and the like and thus deactivates the antioxidant effect. On the other side, it is very desirable to combine the efficient antioxidant properties of phenolic compounds containing thioether groups and the similarly efficient light-stabilizing properties of sterically hindered amines.

Another problem in context with phenolic antioxidants, especially with phenolic antioxidants containing thioether groups like Irganox® 1520 or Irganox® 1726, is a miscibility gap within cured or crosslinked apolar polymers, like STPs. After some time, such cured polymers and more polar or liquid components of the polymer composition, like said phenolic antioxidants, separate, which leads to the formation of an exudate or a white "blooming" or other esthetically and technically inacceptable manifestations.

WO 2016/184932 relates to a stabilized hot melt adhesive containing a hot melt adhesive material and two or three of the following components: (A) a specific monomeric sterically hindered amine; (B) a specific polymeric sterically hindered amine; (C) a specific sterically hindered phenol.

U.S. Pat. No. 5,389,219 relates to an electrodepositable primer composition comprising an aqueous dispersion of an ionic epoxy-based resin, a hindered amine light stabilizer and an antioxidant mixture comprising a phenolic antioxidant and a sulfur-containing antioxidant. The composition used in the examples moreover contains Paraplex WP-1, a plasticizer from Rohm and Haas. According to U.S. Pat. No. 5,272,189, Paraplex WP-1 is a propoxylated cresol.

US 2009/0118401 and US 2012/0316253 relate to a curable composition containing an organic polymer with a crosslinkable silyl group, a triazine-based UV absorber and a HALS. The composition of example 9 contains an acrylic polymer with terminal crosslinkable silyl groups, Tinuvin® 123 as HALS, 1577FF from Ciba Specialty Chemicals as triazine-based UV absorber, moreover AO-20 from Ashahi Denka Co., Ltd. as antioxidant and UP1000, which is an acrylic polymer from Toagosei Co., Ltd., as plasticizer. AO-20 is a phenolic antioxidant and does not contain any thioether groups.

US 2011/0028611 relates to a synthetic resin composition containing a HALS with an alkoxy group on the nitrogen atom and a sulfur-containing antioxidant.

The object of the present invention was to provide a stabilizer composition suitable to stabilize curable compositions to be used as or in sealants, adhesives and/or coating compositions, especially as or in sealant compositions, especially with respect to a good long-term temperature and/or UV and/or oxidation stability after curing. Moreover, the exudation of components of the stabilizer composition from cured polymers, especially from cured STPs, was to be avoided. In addition, the stabilized curable composition should also meet all other conventional requirements of a modern sealant, adhesive and/or coating composition.

Surprisingly it was found that the above-described disadvantages of combining antioxidants containing one or more thioether groups with HALS can be avoided if the amino group of the HALS carries a basicity-reducing substituent. It was moreover found that specific plasticizers can prevent or at least reduce exudation of stabilizer components from cured polymers.

SUMMARY OF THE INVENTION

In one aspect, the invention thus relates to a stabilizer composition comprising:

(a) at least one light stabilizer selected from sterically hindered amines (HALS) in which the amino group carries a basicity-reducing substituent (i.e. a substituent which reduces the electron density on the nitrogen atom of the amino group; such as alkoxy, alkenyloxy, alkynyloxy, cycloalkoxy, phenyloxy or benzyloxy groups, or carbonyl or thiocarbonyl groups either bound directly or flexibly in γ- or δ-position to the nitrogen ring atom so that an intramolecular 5- or 6-membered ring can be formed by interaction of N with the C(=O) or C(=S) group);

(b) at least one antioxidant containing one or more thioether groups; and (c) at least one plasticizer which is liquid at 25° C. (i.e. has a viscosity of at most 250 Pa·s at 25° C. and 1013 mbar, as measured with a CAP 2000+ Viscometer (Brookfield), cone 4, according to DIN EN ISO 3219, annex B at a shear rate of $100 \, s^{-1}$) and which is selected from plasticizers containing carboxylate groups (i.e. carboxylic acid ester groups).

In another aspect, the invention relates to a polymer composition comprising
(i) at least one silyl-terminated polymer; and
(ii) a stabilizer composition as defined above.

In other words, the polymer composition comprises
(i) at least one silyl-terminated polymer;
(ii) at least one light stabilizer selected from sterically hindered amines (HALS) in which the amino group carries a basicity-reducing substituent; at least one antioxidant containing one or more thioether groups; and at least one plasticizer which is liquid at 25° C. and which is selected from plasticizers containing carboxylate groups.

The invention further relates to the use of the stabilizer composition of the invention for stabilizing a silyl-terminated polymer or a sealant, adhesive, gasket, knifing filler or coating composition, especially a sealant, adhesive, gasket, knifing filler or coating composition containing a silyl-terminated polymer, against degradation by heat, light and/or oxygen, to the use of the polymer composition of the invention as or in a sealant, adhesive, gasket, knifing filler or coating composition, to a sealant composition or an adhesive composition, or a gasket composition, or a knifing filler composition or a coating composition comprising the polymer composition of the invention and to a method for stabilizing a silyl-terminated polymer or a sealant, adhesive, gasket, knifing filler or coating composition, especially a sealant, adhesive, liquid gasket, knifing filler or coating composition containing a silyl-terminated polymer, against degradation by heat, light and/or oxygen.

DETAILED DESCRIPTION OF THE INVENTION

The organic moieties mentioned in the below definitions of the variables are collective terms for individual listings of the individual group members. The prefix $C_n$-$C_m$ indicates in each case the possible number of carbon atoms in the group.

The term "alkyl" as used herein and in the alkyl moieties of alkoxy, hydroxyalkyl and the like refers to saturated straight-chain or branched hydrocarbon radicals having 1 to 2 ("$C_1$-$C_2$-alkyl"), 1 to 3 ("$C_1$-$C_3$-alkyl"), 1 to 4 ("$C_1$-$C_4$-alkyl"), 1 to 6 ("$C_1$-$C_6$-alkyl"), 1 to 8 ("$C_1$-$C_8$-alkyl"), 1 to 12 ("$C_1$-$C_{12}$-alkyl"), 4 to 12 ("$C_4$-$C_{12}$-alkyl"), 12 or 13 ("$C_{12}$-$C_{13}$-alkyl"), 1 to 16 ("$C_1$-$C_{16}$-alkyl") 6 to 16 ("$C_6$-$C_{16}$-alkyl") or 4 to 20 ("$C_4$-$C_{20}$-alkyl") carbon atoms. $C_1$-$C_2$-Alkyl is methyl or ethyl. Examples for $C_1$-$C_3$-alkyl are, in addition to those mentioned for $C_1$-$C_2$-alkyl, n-propyl and isopropyl. Examples for $C_1$-$C_4$-alkyl are, in addition to those mentioned for $C_1$-$C_3$-alkyl, n-butyl, 1-methylpropyl (sec-butyl), 2-methylpropyl (isobutyl) or 1,1-dimethylethyl (tert-butyl). Examples for $C_1$-$C_6$-alkyl are, in addition to those mentioned for $C_1$-$C_4$-alkyl, n-pentyl, 1-methylbutyl, 2-methylbutyl, 3-methylbutyl, 2,2-dimethylpropyl, 1-ethylpropyl, 1,1-dimethylpropyl, 1,2-dimethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, or 1-ethyl-2-methylpropyl. Examples for $C_1$-$C_8$-alkyl are, in addition to those mentioned for $C_1$-$C_6$-alkyl, n-heptyl, n-octyl, 2-ethylhexyl and positional isomers thereof. Examples for $C_1$-$C_{10}$-alkyl are, in addition to those mentioned for $C_1$-$C_8$-alkyl, n-nonyl, n-decyl and positional isomers thereof. Examples for $C_1$-$C_{12}$-alkyl are, in addition to those mentioned for $C_1$-$C_{10}$-alkyl, n-undecyl, n-dodecyl, and positional isomers thereof. $C_4$-$C_{12}$-Alkyl is for example n-butyl, 1-methylpropyl (sec-butyl), 2-methylpropyl (isobutyl), 1,1-dimethylethyl (tert-butyl), n-pentyl, 1-methylbutyl, 2-methylbutyl, 3-methylbutyl, 2,2-dimethylpropyl, 1-ethylpropyl, 1,1-dimethylpropyl, 1,2-dimethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, 2-ethylhexyl, n-nonyl, n-decyl, n-undecyl, n-dodecyl, and positional isomers thereof. Examples for $C_1$-$C_{16}$-alkyl are, in addition to those mentioned for $C_1$-$C_{12}$-alkyl, n-tridecyl, n-tetradecyl, n-pentadecyl, n-hexadecyl and positional isomers thereof. Examples for $C_6$-$C_{16}$-alkyl are n-pentyl, 1-methylbutyl, 2-methylbutyl, 3-methylbutyl, 2,2-dimethylpropyl, 1-ethylpropyl, 1,1-dimethylpropyl, 1,2-dimethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, 2-ethylhexyl, n-nonyl, n-decyl, n-undecyl, n-dodecyl, n-tridecyl, n-tetradecyl, n-pentadecyl, n-hexadecyl and positional isomers thereof. Examples for $C_4$-$C_{20}$-alkyl are, in addition to those mentioned for $C_4$-$C_{12}$-alkyl, n-tridecyl, n-tetradecyl, n-pentadecyl, n-hexadecyl, n-heptadecyl, n-octadecyl, n-nonadecyl, n-eicosyl and positional isomers thereof. Examples for $C_1$-$C_{20}$-alkyl are, in addition to those mentioned for $C_1$-$C_{16}$-alkyl, n-heptadecyl, n-octadecyl, n-nonadecyl, n-eicosyl and positional isomers thereof. Examples for $C_{12}$-$C_{13}$-alkyl are n-dodecyl, n-tridecyl and positional isomers thereof.

The term "hydroxyalkyl" denotes an alkyl group, as mentioned above, in which one hydrogen atom is replaced by a hydroxyl group. $C_2$-$C_4$-hydroxyalkyl is a $C_2$-$C_4$-alkyl group in which one hydrogen atom is replaced by a hydroxyl group. Examples are 1-hydroxyethyl, 2-hydroxyethyl, 1-hydroxypropyl, 2-hydroxypropyl, 3-hydroxypropyl, 1-hydroxy-1-methylethyl, 2-hydroxy-1-methylethyl, 1-hydroxybutyl, 2-hydroxybutyl, 3-hydroxybutyl, 4-hydroxybutyl, 1-hydroxy-1-methylpropyl, 2-hydroxy-1-methylpropyl, 3-hydroxy-1-methylpropyl, 1-(hydroxymethyl)-propyl, 1-hydroxy-2-methylpropyl, 2-hydroxy-2-methylpropyl, 3-hydroxy-2-methylpropyl, 2-(hydroxymethyl)-propyl, and 1-(hydroxymethyl)-2-methyl-ethyl. Among these, preference is given to radicals in which the hydroxyl group is not bound to the attachment point of hydroxyalkyl to the remainder of the molecule, especially if the hydroxyalkyl group is bound to an oxygen or a nitrogen atom. Thus, preferred examples of $C_2$-$C_4$-hydroxyalkyl are 2-hydroxyethyl, 2-hydroxypropyl, 3-hydroxypropyl, 2-hydroxy-1-methylethyl, 2-hydroxybutyl, 3-hydroxybutyl, 4-hydroxybutyl, 2-hydroxy-1-methylpropyl, 3-hydroxy-1-methylpropyl, 1-(hydroxymethyl)-propyl, 2-hydroxy-2-methylpropyl, 3-hydroxy-2-methylpropyl, 2-(hydroxymethyl)-propyl, and 1-(hydroxymethyl)-2-methyl-ethyl.

If the term "alkenyl" as used herein and in the alkyl moieties of alkenyloxy is used without prefix ($C_n$-$C_m$), it indicates monounsaturated (i.e. containing one C—C double bond) straight-chain or branched aliphatic hydrocarbon radicals having in general 2 to 20 ("$C_2$-$C_{20}$-alkenyl") carbon atoms, in particular 2 to 10 ("$C_2$-$C_{10}$-alkenyl") carbon atoms, specifically 2 to 6 ("$C_2$-$C_6$-alkenyl") or 2 to 4 ("$C_2$-$C_4$-alkenyl") carbon atoms, where the C—C double bond can be in any position. "$C_2$-$C_3$-alkenyl" refers to monounsaturated straight-chain or branched aliphatic hydrocarbon radicals having 2 to 3 carbon atoms and a C—C double bond in any position. "$C_2$-$C_4$-alkenyl" refers to monounsaturated straight-chain or branched aliphatic hydrocarbon radicals having 2 to 4 carbon atoms and a C—C double bond in any position. "$C_2$-$C_6$-alkenyl" refers to monounsaturated straight-chain or branched aliphatic hydrocarbon radicals having 2 to 6 carbon atoms and a C—C double bond in any position. "$C_2$-$C_8$-alkenyl" refers to monounsaturated straight-chain or branched aliphatic hydrocarbon radicals having 2 to 8 carbon atoms and a C—C double bond in any position. "$C_2$-$C_{10}$-alkenyl" refers to monounsaturated straight-chain or branched aliphatic hydrocarbon radicals having 2 to 10 carbon atoms and a C—C double bond in any position. "$C_2$-$C_{20}$-alkenyl" refers to monounsaturated straight-chain or branched aliphatic hydrocarbon radicals having 2 to 20 carbon atoms and a C—C double bond in any position. Examples for $C_2$-$C_3$-alkenyl are ethenyl, 1-propenyl, 2-propenyl or 1-methylethenyl. Examples for $C_2$-$C_4$-alkenyl are ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl or 2-methyl-2-propenyl. Examples for $C_2$-$C_6$-alkenyl are ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, 1-ethyl-2-methyl-2-propenyl and the like. Examples for $C_2$-$C_{10}$-alkenyl are, in addition to the examples mentioned for $C_2$-$C_6$-alkenyl, 1-heptenyl, 2-heptenyl, 3-heptenyl, 1-octenyl, 2-octenyl, 3-octenyl, 4-octenyl, 1-nonenyl, 2-nonenyl, 3-nonenyl, 4-nonenyl, 1-decenyl, 2-decenyl, 3-decenyl, 4-decenyl, 5-decenyl and the positional isomers thereof.

If the term "alkynyl" as used herein and in the alkynyl moieties of alkynyloxy is used without prefix ($C_n$-$C_m$), it indicates straight-chain or branched aliphatic hydrocarbon radicals having in general 2 to 20 ("$C_2$-$C_{20}$-alkynyl") carbon atoms, in particular 2 to 10 ("$C_2$-$C_{10}$-alkynyl") carbon atoms, specifically 2 to 6 ("$C_2$-$C_6$-alkynyl") or 2 to 4 ("$C_2$-$C_4$-alkynyl") carbon atoms, and one triple bond in any position. "$C_2$-$C_3$-Alkynyl" indicates straight-chain or branched hydrocarbon radicals having 2 to 3 carbon atoms and one triple bond in any position. "$C_2$-$C_4$-Alkynyl" indicates straight-chain or branched hydrocarbon radicals having 2 to 4 carbon atoms and one triple bond in any position. "$C_2$-$C_6$-Alkynyl" indicates straight-chain or branched hydrocarbon radicals having 2 to 6 carbon atoms and one triple bond in any position. "$C_2$-$C_8$-Alkynyl" indicates straight-chain or branched hydrocarbon radicals having 2 to 8 carbon atoms and one triple bond in any position. "$C_2$-$C_{10}$-Alkynyl" indicates straight-chain or branched hydrocarbon radicals having 2 to 10 carbon atoms and one triple bond in any position. "$C_2$-$C_{20}$-Alkynyl" indicates straight-chain or branched hydrocarbon radicals having 2 to 20 carbon atoms and one triple bond in any position. Examples for $C_2$-$C_3$-alkynyl are ethynyl, 1-propynyl or 2-propynyl. Examples for $C_2$-$C_4$-alkynyl are ethynyl, 1-propynyl, 2-propynyl, 1-butynyl, 2-butynyl, 3-butynyl, 1-methyl-2-propynyl and the like. Examples for $C_2$-$C_6$-alkynyl are ethynyl, 1-propynyl, 2-propynyl, 1-butynyl, 2-butynyl, 3-butynyl, 1-methyl-2-propynyl, 1-pentynyl, 2-pentynyl, 3-pentynyl, 4-pentynyl, 1-methyl-2-butynyl, 1-methyl-3-butynyl, 2-methyl-3-butynyl, 3-methyl-1-butynyl, 1,1-dimethyl-2-propynyl, 1-ethyl-2-propynyl, 1-hexynyl, 2-hexynyl, 3-hexynyl, 4-hexynyl, 5-hexynyl, 1-methyl-2-pentynyl, 1-methyl-3-pentynyl, 1-methyl-4-pentynyl, 2-methyl-3-pentynyl, 2-methyl-4-pentynyl, 3-methyl-1-pentynyl, 3-methyl-4-pentynyl, 4-methyl-1-pentynyl, 4-methyl-2-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, 1-ethyl-1-methyl-2-propynyl and the like.

The term "cycloalkyl" as used herein refers to monocyclic saturated hydrocarbon radicals having 3 to 6 carbon atoms ("$C_3$-$C_6$-cycloalkyl"). Examples of $C_3$-$C_6$-cycloalkyl are cyclopropyl, cyclobutyl, cyclopentyl and cyclohexyl.

The term "alkoxy" refers to alkyl group, as defined above, attached via an oxygen atom to the remainder of the molecule. If the term "alkoxy" is used without prefix ($C_n$-$C_m$), it relates to $C_1$-$C_{20}$-alkoxy. "$C_1$-$C_2$-Alkoxy" is a $C_1$-$C_2$-alkyl group, as defined above, attached via an oxygen atom to the remainder of the molecule. "$C_1$-$C_3$-Alkoxy" is a $C_1$-$C_3$-alkyl group, as defined above, attached via an oxygen atom to the remainder of the molecule. "$C_1$-$C_4$-Alkoxy" is a $C_1$-$C_4$-alkyl group, as defined above, attached via an oxygen atom to the remainder of the molecule. "$C_1$-$C_6$-Alkoxy" is a $C_1$-$C_6$-alkyl group, as defined above, attached via an oxygen atom to the remainder of the molecule. "$C_1$-$C_{12}$-Alkoxy" is a $C_1$-$C_{12}$-alkyl group, as defined above, attached via an oxygen atom to the remainder of the molecule. "$C_1$-$C_{20}$-Alkoxy" is a $C_1$-$C_{20}$-alkyl group attached via an oxygen atom to the remainder of the molecule. "$C_{12}$-$C_{14}$-Alkoxy" is a $C_{12}$-$C_{14}$-alkyl group, as defined above, attached via an oxygen atom to the remainder of the molecule. $C_1$-$C_2$-Alkoxy is methoxy or ethoxy. Examples for $C_1$-$C_3$-alkoxy are, in addition to those mentioned for $C_1$-$C_2$-alkoxy, n-propoxy and 1-methylethoxy (isopropoxy). Examples for $C_1$-$C_4$-alkoxy are, in addition to those mentioned for $C_1$-$C_3$-alkoxy, butoxy, 1-methylpropoxy (sec-butoxy), 2-methylpropoxy (isobutoxy) or 1,1-dimethylethoxy (tert-butoxy). Examples for $C_1$-$C_6$-alkoxy are, in addition to those mentioned for $C_1$-$C_4$-alkoxy, pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, hexoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy or 1-ethyl-2-methylpropoxy. Examples for $C_1$-$C_{12}$-alkoxy are, in addition to those mentioned for $C_1$-$C_6$-alkoxy, heptyloxy, octyloxy, 2-ethylhexyloxy, nonyloxy, decyloxy, undecyloxy, dodecyloxy, and positional isomers thereof. Examples for $C_1$-$C_{20}$-alkoxy are, in addition to those mentioned for $C_1$-$C_{12}$-alkoxy, tridecyloxy, tetradecyloxy, pentadecyloxy, hexadecyloxy, heptadecyloxy, octadecyloxy, nonadecyloxy, eicosanyloxy, and positional isomers thereof. Examples for $C_{12}$-$C_{14}$-alkoxy are dodecyloxy, tridecyloxy, tetradecyloxy, and positional isomers thereof.

The term "alkenyloxy" refers to an alkenyl group, as defined above, attached via an oxygen atom to the remainder of the molecule. If the term "alkenyloxy" is used without prefix ($C_n$-$C_m$), it relates to $C_2$-$C_{20}$-alkenyloxy. Examples for $C_2$-$C_3$-alkenyloxy are ethenyloxy, 1-propenyloxy, 2-propenyloxy or 1-methylethenyloxy. Examples for $C_2$-$C_4$-alkenyloxy are ethenyloxy, 1-propenyloxy, 2-propenyloxy, 1-methylethenyloxy, 1-butenyloxy, 2-butenyloxy, 3-butenyloxy, 1-methyl-1-propenyloxy, 2-methyl-1-propenyloxy, 1-methyl-2-propenyloxy or 2-methyl-2-propenyloxy. Examples for $C_2$-$C_6$-alkenyloxy are, in addition to those mentioned for $C_2$-$C_6$-alkenyloxy, 1-pentenyloxy, 2-pentenyloxy, 3-pentenyloxy, 4-pentenyloxy, 1-methyl-1-butenyloxy, 2-methyl-1-butenyloxy, 3-methyl-1-butenyloxy, 1-methyl-2-butenyloxy, 2-methyl-2-butenyloxy, 3-methyl-2-butenyloxy, 1-methyl-3-butenyloxy, 2-methyl-3-butenyloxy, 3-methyl-3-butenyloxy, 1,1-dimethyl-2-propenyloxy, 1,2-dimethyl-1-propenyloxy, 1,2-dimethyl-2-propenyloxy, 1-ethyl-1-propenyloxy, 1-ethyl-2-propenyloxy, 1-hexenyloxy, 2-hexenyloxy, 3-hexenyloxy, 4-hexenyloxy, 5-hexenyloxy, 1-methyl-1-pentenyloxy, 2-methyl-1-pentenyloxy, 3-methyl-1-pentenyloxy, 4-methyl-1-pentenyloxy, 1-methyl-2-pentenyloxy, 2-methyl-2-pentenyloxy, 3-methyl-2-pentenyloxy, 4-methyl-2-pentenyloxy, 1-methyl-3-pentenyloxy, 2-methyl-3-pentenyloxy, 3-methyl-3-pentenyloxy, 4-methyl-3-pentenyloxy, 1-methyl-4-pentenyloxy, 2-methyl-4-pentenyloxy, 3-methyl-4-pentenyloxy, 4-methyl-4-pentenyloxy, 1,1-dimethyl-2-butenyloxy, 1,1-dimethyl-3-butenyloxy, 1,2-dimethyl-1-butenyloxy, 1,2-dimethyl-2-butenyloxy, 1,2-dimethyl-3-butenyloxy, 1,3-dimethyl-1-butenyloxy, 1,3-dimethyl-2-butenyloxy, 1,3-dimethyl-3-butenyloxy, 2,2-dimethyl-3-butenyloxy, 2,3-dimethyl-1-butenyloxy, 2,3-dimethyl-2-butenyloxy, 2,3-dimethyl-3-butenyloxy, 3,3-dimethyl-1-butenyloxy, 3,3-dimethyl-2-butenyloxy, 1-ethyl-1-butenyloxy, 1-ethyl-2-butenyloxy, 1-ethyl-3-butenyloxy, 2-ethyl-1-butenyloxy, 2-ethyl-2-butenyloxy, 2-ethyl-3-butenyloxy, 1,1,2-trimethyl-2-propenyloxy, 1-ethyl-1-methyl-2-propenyloxy, 1-ethyl-2-methyl-1-propenyloxy, 1-ethyl-2-methyl-2-propenyloxy and the like. Examples for $C_2$-$C_{10}$-alkenyloxy are, in addition to the examples mentioned for $C_2$-$C_6$-alkenyloxy, 1-heptenyloxy, 2-heptenyloxy, 3-heptenyloxy, 1-octenyloxy, 2-octenyloxy, 3-octenyloxy, 4-octenyloxy, 1-nonenyloxy, 2-nonenyloxy, 3-nonenyloxy, 4-nonenyloxy, 1-decenyloxy, 2-decenyloxy, 3-decenyloxy, 4-decenyloxy, 5-decenyloxy and the positional isomers thereof.

The term "alkynyloxy" refers to an alkynyl group, as defined above, attached via an oxygen atom to the remainder of the molecule. If the term "alkynyloxy" is used without prefix ($C_n$-$C_m$), it relates to $C_2$-$C_{20}$-alkynyloxy. Examples for $C_2$-$C_3$-alkynyloxy are ethynyloxy, 1-propynyloxy or 2-propynyloxy. Examples for $C_2$-$C_4$-alkynyl are ethynyloxy, 1-propynyloxy, 2-propynyloxy, 1-butynyloxyoxy, 2-butynyl, 3-butynyloxy, 1-methyl-2-propynyloxy and the like. Examples for $C_2$-$C_6$-alkynyloxy are, in addition to those mentioned for $C_2$-$C_6$-alkenyloxy, 1-pentynyloxy, 2-pentynyloxy, 3-pentynyloxy, 4-pentynyloxy, 1-methyl-2-butynyloxy, 1-methyl-3-butynyloxy, 2-methyl-3-butynyloxy, 3-methyl-1-butynyloxy, 1,1-dimethyl-2-propynyloxy, 1-ethyl-2-propynyloxy, 1-hexynyloxy, 2-hexynyloxy, 3-hexynyloxy, 4-hexynyloxy, 5-hexynyloxy, 1-methyl-2-pentynyloxy, 1-methyl-3-pentynyloxy, 1-methyl-4-pentynyloxy, 2-methyl-3-pentynyloxy, 2-methyl-4-pentynyloxy, 3-methyl-1-pentynyloxy, 3-methyl-4-pentynyloxy, 4-methyl-1-pentynyloxy, 4-methyl-2-pentynyloxy, 1,1-dimethyl-2-butynyloxy, 1,1-dimethyl-3-butynyloxy, 1,2-dimethyl-3-butynyloxy, 2,2-dimethyl-3-butynyloxy, 3,3-dimethyl-1-butynyloxy, 1-ethyl-2-butynyloxy, 1-ethyl-3-butynyloxy, 2-ethyl-3-butynyloxy, 1-ethyl-1-methyl-2-propynyloxy and the like.

The term "cycloalkoxy" refers to a cycloalkyl group, as defined above, attached via an oxygen atom to the remainder of the molecule. If the term "cycloalkoxy" is used without prefix ($C_n$-$C_m$), it relates to $C_3$-$C_6$-cycloalkoxy. Examples of $C_3$-$C_6$-cycloalkoxy are cyclopropoxy, cyclobutoxy, cyclopentoxy and cyclohexoxy.

The term "alkylthio" refers to alkyl group, as defined above, attached via a sulfur atom to the remainder of the molecule. "$C_1$-$C_2$-Alkylthio" is a $C_1$-$C_2$-alkyl group, as defined above, attached via a sulfur atom to the remainder of the molecule. "$C_1$-$C_3$-Alkylthio" is a $C_1$-$C_3$-alkyl group, as defined above, attached via a sulfur atom to the remainder of the molecule. "$C_1$-$C_4$-Alkylthio" is a $C_1$-$C_4$-alkyl group, as defined above, attached via a sulfur atom to the remainder of the molecule. "$C_1$-$C_6$-Alkylthio" is a $C_1$-$C_6$-alkyl group, as defined above, attached via a sulfur atom to the remainder of the molecule. $C_1$-$C_2$-Alkylthio is methylthio or ethylthio. Examples for $C_1$-$C_3$-alkylthio are, in addition to those mentioned for $C_1$-$C_2$-alkylthio, n-propylthio and 1-methylethylthio (isopropylthio). Examples for $C_1$-$C_4$-alkylthio are, in addition to those mentioned for $C_1$-$C_3$-alkylthio, butylthio, 1-methylpropylthio (sec-butylthio), 2-methylpropylthio (isobutylthio) or 1,1-dimethylethylthio (tert-butylthio). Examples for $C_1$-$C_6$-alkylthio are, in addition to those mentioned for $C_1$-$C_4$-alkylthio, pentylthio, 1-methylbutylthio, 2-methylbutylthio, 3-methylbutylthio, 1,1-dimethylpropylthio, 1,2-dimethylpropylthio, 2,2-dimethylpropylthio, 1-ethylpropylthio, hexylthio, 1-methylpentylthio, 2-methylpentylthio, 3-methylpentylthio, 4-methylpentylthio, 1,1-dimethylbutylthio, 1,2-dimethylbutylthio, 1,3-dimethylbutylthio, 2,2-dimethylbutylthio, 2,3-dimethylbutylthio, 3,3-dimethylbutylthio, 1-ethylbutylthio, 2-ethylbutylthio, 1,1,2-trimethylpropylthio, 1,2,2-trimethylpropylthio, 1-ethyl-1-methylpropylthio or 1-ethyl-2-methylpropylthio.

The term "alkylsulfinyl" refers to alkyl group, as defined above, attached via a sulfinyl group [S(=O)] to the remainder of the molecule. "$C_1$-$C_2$-Alkylsulfinyl" is a $C_1$-$C_2$-alkyl group, as defined above, attached via a sulfinyl group to the remainder of the molecule. "$C_1$-$C_3$-Alkylsulfinyl" is a $C_1$-$C_3$-alkyl group, as defined above, attached via a sulfinyl group to the remainder of the molecule. "$C_1$-$C_4$-Alkylsulfinyl" is a $C_1$-$C_4$-alkyl group, as defined above, attached via a sulfinyl group to the remainder of the molecule. "$C_1$-$C_6$-Alkylsulfinyl" is a $C_1$-$C_6$-alkyl group, as defined above, attached via a sulfinyl group to the remainder of the molecule. $C_1$-$C_2$-Alkylsulfinyl is methylsulfinyl or ethylsulfinyl. Examples for $C_1$-$C_3$-alkylsulfinyl are, in addition to those mentioned for $C_1$-$C_2$-alkylsulfinyl, n-propylsulfinyl and 1-methylethylsulfinyl (isopropylsulfinyl). Examples for $C_1$-$C_4$-alkylsulfinyl are, in addition to those mentioned for $C_1$-$C_3$-alkylsulfinyl, butylsulfinyl, 1-methylpropylsulfinyl (sec-butylsulfinyl), 2-methylpropylsulfinyl (isobutylsulfinyl) or 1,1-dimethylethylsulfinyl (tert-butylsulfinyl). Examples for $C_1$-$C_6$-alkylsulfinyl are, in addition to those mentioned for $C_1$-$C_4$-alkylsulfinyl, pentylsulfinyl, 1-methylbutylsulfinyl, 2-methylbutylsulfinyl, 3-methylbutylsulfinyl, 1,1-dimethylpropylsulfinyl, 1,2-dimethylpropylsulfinyl, 2,2-dimethylpropylsulfinyl, 1-ethylpropylsulfinyl, hexylsulfinyl, 1-methylpentylsulfinyl, 2-methylpentylsulfinyl, 3-methylpentylsulfinyl, 4-methylpentylsulfinyl, 1,1-dimethylbutylsulfinyl, 1,2-dimethylbutylsulfinyl, 1,3-dimethylbutylsulfinyl, 2,2-dimethylbutylsulfinyl, 2,3-dimethylbutylsulfinyl, 3,3-dimethylbutylsulfinyl, 1-ethylbutylsulfinyl, 2-ethylbutylsulfinyl, 1,1,2-trimethylpropylsulfinyl, 1,2,2-trimethylpropylsulfinyl, 1-ethyl-1-methylpropylsulfinyl or 1-ethyl-2-methylpropylsulfinyl.

The term "alkylsulfonyl" refers to alkyl group, as defined above, attached via a sulfonyl group [S(=O)$_2$] to the remainder of the molecule. "$C_1$-$C_2$-Alkylsulfonyl" is a $C_1$-$C_2$-alkyl group, as defined above, attached via a sulfonyl group to the remainder of the molecule. "$C_1$-$C_3$-Alkylsulfonyl" is a $C_1$-$C_3$-alkyl group, as defined above, attached via a sulfonyl group to the remainder of the molecule. "$C_1$-$C_4$-Alkylsulfonyl" is a $C_1$-$C_4$-alkyl group, as defined above, attached via a sulfonyl group to the remainder of the molecule. "$C_1$-$C_6$-Alkylsulfonyl" is a $C_1$-$C_6$-alkyl group, as defined above, attached via a sulfonyl group to the remainder of the molecule. $C_1$-$C_2$-Alkylsulfonyl is methylsulfonyl or ethylsulfonyl. Examples for $C_1$-$C_3$-alkylsulfonyl are, in addition to those mentioned for $C_1$-$C_2$-alkylsulfonyl, n-propylsulfonyl and 1-methylethylsulfonyl (isopropylsulfonyl). Examples for $C_1$-$C_4$-alkylsulfonyl are, in addition to those mentioned for $C_1$-$C_3$-alkylsulfonyl, butylsulfonyl, 1-methylpropylsulfonyl (sec-butylsulfonyl), 2-methylpropylsulfonyl (isobutylsulfonyl) or 1,1-dimethylethylsulfonyl (tert-butylsulfonyl). Examples for $C_1$-$C_6$-alkylsulfonyl are, in addition to those mentioned for $C_1$-$C_4$-alkylsulfonyl, pentylsulfonyl, 1-methylbutylsulfonyl, 2-methylbutylsulfonyl, 3-methylbutylsulfonyl, 1,1-dimethylpropylsulfonyl, 1,2-dimethylpropylsulfonyl, 2,2-dimethylpropylsulfonyl, 1-ethylpropylsulfonyl, hexylsulfonyl, 1-methylpentylsulfonyl, 2-methylpentylsulfonyl, 3-methylpentylsulfonyl, 4-methylpentylsulfonyl, 1,1-dimethylbutylsulfonyl, 1,2-dimethylbutylsulfonyl, 1,3-dimethylbutylsulfonyl, 2,2-dimethylbutylsulfonyl, 2,3-dimethylbutylsulfonyl, 3,3-dimethylbutylsulfonyl, 1-ethylbutylsulfonyl, 2-ethylbutylsulfonyl, 1,1,2-trimethylpropylsulfonyl, 1,2,2-trimethylpropylsulfonyl, 1-ethyl-1-methylpropylsulfonyl or 1-ethyl-2-methylpropylsulfonyl.

The term "alkylcarbonyl" refers to alkyl group, as defined above, attached via a carbonyl group [C(=O)] to the remainder of the molecule. "$C_1$-$C_2$-Alkylcarbonyl" is a $C_1$-$C_2$-alkyl group, as defined above, attached via a carbonyl group to the remainder of the molecule. "$C_1$-$C_3$-Alkylcarbonyl" is a $C_1$-$C_3$-alkyl group, as defined above, attached via a carbonyl group to the remainder of the molecule. "$C_1$-$C_4$-Alkylcarbonyl" is a $C_1$-$C_4$-alkyl group, as defined above, attached via a carbonyl group to the remainder of the molecule. "$C_1$-$C_6$-Alkylcarbonyl" is a $C_1$-$C_6$-alkyl group, as defined above, attached via a carbonyl group to the remainder of the molecule. $C_1$-$C_2$-Alkylcarbonyl is methylcarbonyl or ethylcarbonyl. Examples for $C_1$-$C_3$-alkylcarbonyl are, in addition to those mentioned for $C_1$-$C_2$-alkylcarbonyl, n-propylcarbonyl and 1-methylethylcarbonyl (isopropylcarbonyl). Examples for $C_1$-$C_4$-alkylcarbonyl are, in addition to those mentioned for $C_1$-$C_3$-alkylcarbonyl, butylcarbonyl, 1-methylpropylcarbonyl (sec-butylcarbonyl), 2-methylpropylcarbonyl (isobutylcarbonyl) or 1,1-dimethylethylcarbonyl (tert-butylcarbonyl). Examples for $C_1$-$C_6$-alkylcarbonyl are, in addition to those mentioned for $C_1$-$C_4$-alkylcarbonyl, pentylcarbonyl, 1-methylbutylcarbonyl, 2-methylbutylcarbonyl, 3-methylbutylcarbonyl, 1,1-dimethylpropylcarbonyl, 1,2-dimethylpropylcarbonyl, 2,2-di methyl propylcarbonyl, 1-ethylpropylcarbonyl, hexylcarbonyl, 1-methylpentylcarbonyl, 2-methylpentylcarbonyl, 3-methylpentylcarbonyl, 4-methylpentylcarbonyl, 1,1-dimethylbutylcarbonyl, 1,2-dimethylbutylcarbonyl, 1,3-dimethylbutylcarbonyl, 2,2-dimethylbutylcarbonyl, 2,3-dimethylbutylcarbonyl, 3,3-dimethylbutylcarbonyl, 1-ethylbutylcarbonyl, 2-ethylbutylcarbonyl, 1,1,2-trimethylpropylcarbonyl, 1,2,2-trimethylpropylcarbonyl, 1-ethyl-1-methylpropylcarbonyl or 1-ethyl-2-methylpropylcarbonyl.

The term "alkoxycarbonyl" refers to alkoxy group, as defined above, attached via a carbonyl group [C(=O)] to the remainder of the molecule. "$C_1$-$C_2$-Alkoxycarbonyl" is a $C_1$-$C_2$-alkoxy group, as defined above, attached via a carbonyl group to the remainder of the molecule. "$C_1$-$C_3$-Alkoxycarbonyl" is a $C_1$-$C_3$-alkoxy group, as defined above, attached via a carbonyl group to the remainder of the molecule. "$C_1$-$C_4$-Alkoxycarbonyl" is a $C_1$-$C_4$-alkoxy group, as defined above, attached via a carbonyl group to the remainder of the molecule. "$C_1$-$C_6$-Alkoxycarbonyl" is a $C_1$-$C_6$-alkoxy group, as defined above, attached via a carbonyl group to the remainder of the molecule. $C_1$-$C_2$-Alkoxycarbonyl is methoxycarbonyl or ethoxycarbonyl. Examples for $C_1$-$C_3$-alkoxycarbonyl are, in addition to those mentioned for $C_1$-$C_2$-alkoxycarbonyl, n-propoxycarbonyl and 1-methylethoxycarbonyl (isopropoxycarbonyl). Examples for $C_1$-$C_4$-alkoxycarbonyl are, in addition to those mentioned for $C_1$-$C_3$-alkoxycarbonyl, butoxycarbonyl, 1-methylpropoxycarbonyl (sec-butoxycarbonyl), 2-methylpropoxycarbonyl (isobutoxycarbonyl) or 1,1-dimethylethoxycarbonyl (tert-butoxycarbonyl). Examples for $C_1$-$C_6$-alkoxycarbonyl are, in addition to those mentioned for $C_1$-$C_4$-alkoxycarbonyl, pentoxycarbonyl, 1-methylbutoxycarbonyl, 2-methylbutoxycarbonyl, 3-methylbutoxycarbonyl, 1,1-dimethylpropoxycarbonyl, 1,2-dimethylpropoxycarbonyl, 2,2-di methylpropoxycarbonyl, 1-ethylpropoxycarbonyl, hexoxycarbonyl, 1-methylpentoxycarbonyl, 2-methylpentoxycarbonyl, 3-methylpentoxycarbonyl, 4-methylpentoxycarbonyl, 1,1-dimethylbutoxycarbonyl, 1,2-dimethylbutoxycarbonyl, 1,3-dimethylbutoxycarbonyl, 2,2-dimethylbutoxycarbonyl, 2,3-dimethylbutoxycarbonyl, 3,3-di methyl butoxycarbonyl, 1-ethylbutoxycarbonyl, 2-ethylbutoxycarbonyl, 1,1,2-trimethylpropoxycarbonyl, 1,2,2-trimethylpropoxycarbonyl, 1-ethyl-1-methylpropoxycarbonyl or 1-ethyl-2-methylpropoxycarbonyl.

"Amino" is —NH$_2$.

"C$_1$-C$_4$-alkylamino" is a group —N(H)—C$_1$-C$_4$-alkyl, where C$_1$-C$_4$-alkyl is as defined above Examples are methylamino, ethylamino, propylamino, isopropylamino, butylamino and the like.

The term "di(C$_1$-C$_4$-alkyl)amino" denotes a group —N(C$_1$-C$_4$-alkyl)$_2$, where each C$_1$-C$_4$-alkyl is independently as defined above. Examples are dimethylamino, diethylamino, ethylmethylamino, dipropylamino, diisopropylamino, methylpropylamino, methylisopropylamino, ethylpropylamino, ethylisopropylamino, dibutylamino and the like.

"Aminocarbonyl" is —C(O)—NH$_2$.

The term "C$_1$-C$_4$-alkylaminocarbonyl" denotes a group —C(=O)—N(H)—C$_1$-C$_4$-alkyl, where C$_1$-C$_4$-alkyl is as defined above Examples are methylaminocarbonyl, ethylaminocarbonyl, propylaminocarbonyl, isopropylaminocarbonyl, butylaminocarbonyl and the like.

The term "di(C$_1$-C$_4$-alkyl)aminocarbonyl" is a group —C(=O)—N(C$_1$-C$_4$-alkyl)$_2$, where each C$_1$-C$_4$-alkyl is independently as defined above. Examples are dimethylaminocarbonyl, diethylaminocarbonyl, ethylmethylaminocarbonyl, dipropylaminocarbonyl, diisopropylaminocarbonyl, methylpropylaminocarbonyl, methylisopropylaminocarbonyl, ethylpropylaminocarbonyl, ethylisopropylaminocarbonyl, dibutylaminocarbonyl and the like.

Alkylene is a linear or branched divalent alkanediyl radical. C$_1$-C$_3$-Alkylene is a linear or branched divalent alkyl radical having 1, 2 or 3 carbon atoms. Examples are —CH$_2$—, —CH$_2$CH$_2$—, —CH(CH$_3$)—, —CH$_2$CH$_2$CH$_2$—, —CH(CH$_3$)CH$_2$—, —CH$_2$CH(CH$_3$)— and —C(CH$_3$)$_2$—.

C$_3$-Alkylene is a linear or branched divalent alkyl radical having 3 carbon atoms. Examples are —CH$_2$CH$_2$CH$_2$—, —CH(CH$_3$)CH$_2$—, —CH$_2$CH(CH$_3$)— and —C(CH$_3$)$_2$—.

C$_1$-C$_4$-Alkylene is a linear or branched divalent alkyl radical having 1, 2, 3 or 4 carbon atoms. Examples are —CH$_2$—, —CH$_2$CH$_2$—, —CH(CH$_3$)—, —CH$_2$CH$_2$CH$_2$—, —CH(CH$_3$)CH$_2$—, —CH$_2$CH(CH$_3$)—, —C(CH$_3$)$_2$—, —CH$_2$CH$_2$CH$_2$CH$_2$—, —CH(CH$_3$)CH$_2$CH$_2$—, —CH$_2$CH$_2$CH(CH$_3$)—, —C(CH$_3$)$_2$CH$_2$—, and —CH$_2$C(CH$_3$)$_2$—.

Linear or branched C$_2$-C$_4$-alkylene is a linear or branched divalent alkyl radical having 2, 3 or 4 carbon atoms. Examples are —CH$_2$CH$_2$—, —CH(CH$_3$)—, —CH$_2$CH$_2$CH$_2$—, —CH(CH$_3$)CH$_2$—, —CH$_2$CH(CH$_3$)—, —C(CH$_3$)$_2$—, —CH$_2$CH$_2$CH$_2$CH$_2$—, —CH(CH$_3$)CH$_2$CH$_2$—, —CH$_2$CH$_2$CH(CH$_3$)—, —C(CH$_3$)$_2$CH$_2$— and —CH$_2$C(CH$_3$)$_2$—.

Linear or branched C$_2$-C$_{10}$-alkylene is a linear or branched divalent alkyl radical having 2, 3, 4, 5, 6, 7, 8, 9 or 10 carbon atoms. Examples, in addition to the radicals stated above for C$_2$-C$_4$-alkylene, are —(CH$_2$)$_5$—, —(CH$_2$)$_6$—, —(CH$_2$)$_7$—, —(CH$_2$)$_8$—, —(CH$_2$)$_9$—, —(CH$_2$)$_{10}$— and positional isomers thereof.

Linear or branched C$_1$-C$_{10}$-alkylene is a linear or branched divalent alkyl radical having 1, 2, 3, 4, 5, 6, 7, 8, 9 or 10 carbon atoms. One example, in addition to the radicals stated above for C$_2$-C$_{10}$-alkylene, is methylene (—CH$_2$—).

Linear or branched C$_6$-C$_{10}$-alkylene is a linear or branched divalent alkyl radical having 6, 7, 8, 9 or 10 carbon atoms. Examples are —(CH$_2$)$_6$—, —(CH$_2$)$_7$—, —(CH$_2$)$_8$—, —(CH$_2$)$_9$—, —(CH$_2$)$_{10}$— and positional isomers thereof.

Alkenylene is a linear or branched divalent alkenediyl radical, e.g. C$_2$-C$_4$-alkenylene, which is in turn a linear or branched divalent alkenyl radical having 2, 3 or 4 carbon atoms. Examples are —CH=CH—, —CH=CH—CH$_2$—, —CH$_2$—CH=CH—, —CH=CH—CH$_2$—CH$_2$—, —CH$_2$—CH=CH—CH$_2$—, and —CH$_2$—CH$_2$—CH=CH—.

Alkynylene is a linear or branched divalent alkynediyl radical, e.g. C$_2$-C$_4$-alkynylene, which is in turn a linear or branched divalent alkynyl radical having 2, 3 or 4 carbon atoms. Examples are —C≡C—, —C≡C—CH$_2$—, —CH$_2$—C≡C—, —C≡C—CH$_2$—CH$_2$—, —CH$_2$—C≡C—CH$_2$—, and —CH$_2$—CH$_2$—C≡C—.

Divalent aliphatic radicals are those which contain no cycloaliphatic, aromatic or heterocyclic constituents. Examples are alkylene, alkenylene, and alkynylene radicals.

Divalent cycloaliphatic radicals may contain one or more, e.g., one or two, cycloaliphatic radicals; however, they contain no aromatic or heterocyclic constituents. The cycloaliphatic radicals may be substituted by aliphatic radicals, but bonding sites for the NH groups (see below embodiments of the invention) are located on the cycloaliphatic radical.

Divalent aromatic radicals may contain one or more, e.g., one or two, aromatic radicals; however, they contain no cycloaliphatic or heterocyclic constituents. The aromatic radicals may be substituted by aliphatic radicals, but both bonding sites for the NH groups are located on the aromatic radical(s).

Alkanols are compounds of formula R—OH in which R is a linear or branched alkyl group. C$_1$-C$_4$-alkanols are compounds R—OH in which R is a linear or branched C$_1$-C$_4$-alkyl group. C$_1$-C$_6$-alkanols are compounds R—OH in which R is a linear or branched C$_1$-C$_6$-alkyl group. Examples for C$_1$-C$_4$-alkanols are methanol, ethanol, n-propanol, isopropanol, n-butanol, sec-butanol, isobutanol and tert-butanol. Examples for C$_1$-C$_6$-alkanols are, in addition to those mentioned for C$_1$-C$_4$-alkanols, 1-pentanol, 2-pentanol, 3-pentanol, 1-hexanol, 2-hexanol, 3-hexanol and the isomers thereof.

Alkanediols are compounds of formula HO-A-OH in which A is a linear or branched alkylene group, i.e. a divalent linear or branched alkanediyl radical. C$_2$-C$_4$-alkanediols are compounds of formula HO-A-OH in which A is a linear or branched C$_2$-C$_4$-alkylene group. Examples are 1,2-ethanediol (ethylene glycol), 1,2-propanediol (propylene glycol), 1,3-propanediol, 1,2-butanediol, 1,3-butanediol and 1,4-butanediol.

The term "3-, 4-, 5-, 6- or 7-membered saturated, partially unsaturated or maximally unsaturated heterocyclic ring containing 1, 2 or 3 heteroatoms or heteroatom groups selected from the group consisting of N, O, S, NO, SO and SO$_2$, as ring members" [wherein "maximum unsaturated" includes also "aromatic"] as used herein denotes monocyclic radicals, the monocyclic radicals being saturated, partially unsaturated or maximum unsaturated (including aromatic).

Unsaturated rings contain at least one C—C and/or C—N and/or N—N double bond(s). Maximally unsaturated rings contain as many conjugated C—C and/or C—N and/or N—N double bonds as allowed by the ring size. Maximally unsaturated 5- or 6-membered heteromonocyclic rings are generally aromatic. Exceptions are maximally unsaturated 6-membered rings containing O, S, SO and/or SO$_2$ as ring members, such as pyran and thiopyran, which are not aromatic. Partially unsaturated rings contain less than the maximum number of C—C and/or C—N and/or N—N double bond(s) allowed by the ring size. The heterocyclic ring may be attached to the remainder of the molecule via a carbon ring member or via a nitrogen ring member. As a matter of course, the heterocyclic ring contains at least one carbon ring atom. If the ring contains more than one O ring atom, these are not adjacent.

Examples of a 3-, 4-, 5-, 6- or 7-membered saturated heteromonocyclic ring include: Oxiran-2-yl, thiiran-2-yl, aziridin-1-yl, aziridin-2-yl, oxetan-2-yl, oxetan-3-yl, thietan-2-yl, thietan-3-yl, 1-oxothietan-2-yl, 1-oxothietan-3-yl, 1,1-dioxothietan-2-yl, 1,1-dioxothietan-3-yl, azetidin-1-yl, azetidin-2-yl, azetidin-3-yl, tetrahydrofuran-2-yl, tetrahydrofuran-3-yl, tetrahydrothien-2-yl, tetrahydrothien-3-yl, 1-oxotetrahydrothien-2-yl, 1,1-dioxotetrahydrothien-2-yl, 1-oxotetrahydrothien-3-yl, 1,1-dioxotetrahydrothien-3-yl, pyrrolidin-1-yl, pyrrolidin-2-yl, pyrrolidin-3-yl, pyrazolidin-1-yl, pyrazolidin-3-yl, pyrazolidin-4-yl, pyrazolidin-5-yl, imidazolidin-1-yl, imidazolidin-2-yl, imidazolidin-4-yl, oxazolidin-2-yl, oxazolidin-3-yl, oxazolidin-4-yl, oxazolidin-5-yl, isoxazolidin-2-yl, isoxazolidin-3-yl, isoxazolidin-4-yl, isoxazolidin-5-yl, thiazolidin-2-yl, thiazolidin-3-yl, thiazolidin-4-yl, thiazolidin-5-yl, isothiazolidin-2-yl, isothiazolidin-3-yl, isothiazolidin-4-yl, isothiazolidin-5-yl, 1,2,4-oxadiazolidin-2-yl, 1,2,4-oxadiazolidin-3-yl, 1,2,4-oxadiazolidin-4-yl, 1,2,4-oxadiazolidin-5-yl, 1,2,4-thiadiazolidin-2-yl, 1,2,4-thiadiazolidin-3-yl, 1,2,4-thiadiazolidin-4-yl, 1,2,4-thiadiazolidin-5-yl, 1,2,4-triazolidin-1-yl, 1,2,4-triazolidin-3-yl, 1,2,4-triazolidin-4-yl, 1,3,4-oxadiazolidin-2-yl, 1,3,4-oxadiazolidin-3-yl, 1,3,4-thiadiazolidin-2-yl, 1,3,4-thiadiazolidin-3-yl, 1,3,4-triazolidin-1-yl, 1,3,4-triazolidin-2-yl, 1,3,4-triazolidin-3-yl, tetrahydropyran-2-yl, tetrahydropyran-3-yl, tetrahydropyran-4-yl, 1,3-dioxan-2-yl, 1,3-dioxan-4-yl, 1,3-dioxan-5-yl, 1,4-dioxan-2-yl, piperidin-1-yl, piperidin-2-yl, piperidin-3-yl, piperidin-4-yl, hexahydropyridazin-1-yl, hexahydropyridazin-3-yl, hexahydropyridazin-4-yl, hexahydropyrimidin-1-yl, hexahydropyrimidin-2-yl, hexahydropyrimidin-4-yl, hexahydropyrimidin-5-yl, piperazin-1-yl, piperazin-2-yl, 1,3,5-hexahydrotriazin-1-yl, 1,3,5-hexahydrotriazin-2-yl, 1,2,4-hexahydrotriazin-1-yl, 1,2,4-hexahydrotriazin-2-yl, 1,2,4-hexahydrotriazin-3-yl, 1,2,4-hexahydrotriazin-4-yl, 1,2,4-hexahydrotriazin-5-yl, 1,2,4-hexahydrotriazin-6-yl, morpholin-2-yl, morpholin-3-yl, morpholin-4-yl, thiomorpholin-2-yl, thiomorpholin-3-yl, thiomorpholin-4-yl, 1-oxothiomorpholin-2-yl, 1-oxothiomorpholin-3-yl, 1-oxothiomorpholin-4-yl, 1,1-dioxothiomorpholin-2-yl, 1,1-dioxothiomorpholin-3-yl, 1,1-dioxothiomorpholin-4-yl, azepan-1-, -2-, -3- or -4-yl, oxepan-2-, -3-, -4- or -5-yl, hexahydro-1,3-diazepinyl, hexahydro-1,4-diazepinyl, hexahydro-1,3-oxazepinyl, hexahydro-1,4-oxazepinyl, hexahydro-1,3-dioxepinyl, hexahydro-1,4-dioxepinyl, and the like.

Examples of a 3-, 4-, 5-, 6- or 7-membered partially unsaturated heteromonocyclic ring include: 2,3-dihydrofuran-2-yl, 2,3-dihydrofuran-3-yl, 2,4-dihydrofuran-2-yl, 2,4-dihydrofuran-3-yl, 2,3-dihydrothien-2-yl, 2,3-dihydrothien-3-yl, 2,4-dihydrothien-2-yl, 2,4-dihydrothien-3-yl, 2-pyrrolin-2-yl, 2-pyrrolin-3-yl, 3-pyrrolin-2-yl, 3-pyrrolin-3-yl, 2-isoxazolin-3-yl, 3-isoxazolin-3-yl, 4-isoxazolin-3-yl, 2-isoxazolin-4-yl, 3-isoxazolin-4-yl, 4-isoxazolin-4-yl, 2-isoxazolin-5-yl, 3-isoxazolin-5-yl, 4-isoxazolin-5-yl, 2-isothiazolin-3-yl, 3-isothiazolin-3-yl, 4-isothiazolin-3-yl, 2-isothiazolin-4-yl, 3-isothiazolin-4-yl, 4-isothiazolin-4-yl, 2-isothiazolin-5-yl, 3-isothiazolin-5-yl, 4-isothiazolin-5-yl, 2,3-dihydropyrazol-1-yl, 2,3-dihydropyrazol-2-yl, 2,3-dihydropyrazol-3-yl, 2,3-dihydropyrazol-4-yl, 2,3-dihydropyrazol-5-yl, 3,4-dihydropyrazol-1-yl, 3,4-dihydropyrazol-3-yl, 3,4-dihydropyrazol-4-yl, 3,4-dihydropyrazol-5-yl, 4,5-dihydropyrazol-1-yl, 4,5-dihydropyrazol-3-yl, 4,5-dihydropyrazol-4-yl, 4,5-dihydropyrazol-5-yl, 2,3-dihydrooxazol-2-yl, 2,3-dihydrooxazol-3-yl, 2,3-dihydrooxazol-4-yl, 2,3-dihydrooxazol-5-yl, 3,4-dihydrooxazol-2-yl, 3,4-dihydrooxazol-3-yl, 3,4-dihydrooxazol-4-yl, 3,4-dihydrooxazol-5-yl, 3,4-dihydrooxazol-2-yl, 3,4-dihydrooxazol-3-yl, 3,4-dihydrooxazol-4-yl, 2-, 3-, 4-, 5- or 6-di- or tetrahydropyridinyl, 3-di- or tetrahydropyridazinyl, 4-di- or tetrahydropyridazinyl, 2-di- or tetrahydropyrimidinyl, 4-di- or tetrahydropyrimidinyl, 5-di- or tetrahydropyrimidinyl, di- or tetrahydropyrazinyl, 1,3,5-di- or tetrahydrotriazin-2-yl, 1,2,4-di- or tetrahydrotriazin-3-yl, 2,3,4,5-tetrahydro[1H]azepin-1-, -2-, -3-, -4-, -5-, -6- or -7-yl, 3,4,5,6-tetrahydro[2H]azepin-2-, -3-, -4-, -5-, -6- or -7-yl, 2,3,4,7-tetrahydro[1H]azepin-1-, -2-, -3-, -4-, -5-, -6- or -7-yl, 2,3,6,7-tetrahydro[1H]azepin-1-, -2-, -3-, -4-, -5-, -6- or -7-yl, tetrahydrooxepinyl, such as 2,3,4,5-tetrahydro[1H]oxepin-2-, -3-, -4-, -5-, -6- or -7-yl, 2,3,4,7-tetrahydro[1H]oxepin-2-, -3-, -4-, -5-, -6- or -7-yl, 2,3,6,7-tetrahydro[1H]oxepin-2-, -3-, -4-, -5-, -6- or -7-yl, tetrahydro-1,3-diazepinyl, tetrahydro-1,4-diazepinyl, tetrahydro-1,3-oxazepinyl, tetrahydro-1,4-oxazepinyl, tetrahydro-1,3-dioxepinyl, tetrahydro-1,4-dioxepinyl and the like.

Examples of a 3-, 4-, 5-, 6- or 7-membered maximally unsaturated (including aromatic) heteromonocyclic ring are 2-furyl, 3-furyl, 2-thienyl, 3-thienyl, 1-pyrrolyl, 2-pyrrolyl, 3-pyrrolyl, 1-pyrazolyl, 3-pyrazolyl, 4-pyrazolyl, 5-pyrazolyl, 1-imidazolyl, 2-imidazolyl, 4-imidazolyl, 5-imidazolyl, 2-oxazolyl, 4-oxazolyl, 5-oxazolyl, 3-isoxazolyl, 4-isoxazolyl, 5-isoxazolyl, 2-thiazolyl, 4-thiazolyl, 5-thiazolyl, 3-isothiazolyl, 4-isothiazolyl, 5-isothiazolyl, 1,3,4-triazol-1-yl, 1,3,4-triazol-2-yl, 1,3,4-triazol-3-yl, 1,2,3-triazol-1-yl, 1,2,3-triazol-2-yl, 1,2,3-triazol-4-yl, 1,2,5-oxadiazol-3-yl, 1,2,3-oxadiazol-4-yl, 1,2,3-oxadiazol-5-yl, 1,3,4-oxadiazol-2-yl, 1,2,5-thiadiazol-3-yl, 1,2,3-thiadiazol-4-yl, 1,2,3-thiadiazol-5-yl, 1,3,4-thiadiazol-2-yl, 2-pyridinyl, 3-pyridinyl, 4-pyridinyl, 1-oxopyridin-2-yl, 1-oxopyridin-3-yl, 1-oxopyridin-4-yl, 3-pyridazinyl, 4-pyridazinyl, 2-pyrimidinyl, 4-pyrimidinyl, 5-pyrimidinyl, 2-pyrazinyl, 1,3,5-triazin-2-yl, 1,2,4-triazin-3-yl, 1,2,4-triazin-5-yl, 1,2,3,4-tetrazin-1-yl, 1,2,3,4-tetrazin-2-yl, 1,2,3,4-tetrazin-5-yl, pyran-2-yl, pyran-3-yl, pyran-4-yl, thiopyran-2-yl, thiopryran-3-yl, thiopryran-4-yl, 1-oxothiopryran-2-yl, 1-oxothiopryran-3-yl, 1-oxothiopryran-4-yl, 1,1-dioxothiopryran-2-yl, 1,1-dioxothiopryran-3-yl, 1,1-dioxothiopryran-4-yl, 2H-oxazin-2-yl, 2H-oxazin-3-yl, 2H-oxazin-4-yl, 2H-oxazin-5-yl, 2H-oxazin-6-yl, 4H-oxazin-3-yl, 4H-oxazin-4-yl, 4H-oxazin-5-yl, 4H-oxazin-6-yl, 6H-oxazin-3-yl, 6H-oxazin-4-yl, 7H-oxazin-5-yl, 8H-oxazin-6-yl, 2H-1,3-oxazin-2-yl, 2H-1,3-oxazin-4-yl, 2H-1,3-oxazin-5-yl, 2H-1,3-oxazin-6-yl, 4H-1,3-oxazin-2-yl, 4H-1,3-oxazin-4-yl, 4H-1,3-oxazin-5-yl, 4H-1,3-oxazin-6-yl, 6H-1,3-oxazin-2-yl, 6H-1,3-oxazin-4-yl, 6H-1,3-oxazin-5-yl, 6H-1,3-oxazin-6-yl, 2H-1,4-oxazin-2-yl, 2H-1,4-oxazin-3-yl, 2H-1,4-oxazin-5-yl, 2H-1,4-oxazin-6-yl, 4H-1,4-oxazin-2-yl, 4H-1,4-oxazin-3-yl, 4H-1,4-oxazin-4-yl, 4H-1,4-oxazin-5-yl, 4H-1,4-oxazin-6-yl, 6H-1,4-oxazin-2-yl, 6H-1,4-oxazin-3-yl, 6H-1,4-oxazin-5-yl, 6H-1,4-oxazin-6-yl, 1,4-dioxine-2-yl, 1,4-oxathiin-2-yl, 1H-azepine, 1H-[1,3]-diazepine, 1H-[1,4]-diazepine, and the like.

Examples for 5- or 6-membered monocyclic heteroaromatic rings containing 1, 2, 3 or 4 heteroatoms selected from the group consisting of N, O and S as ring members are 2-furyl, 3-furyl, 2-thienyl, 3-thienyl, 1-pyrrolyl, 2-pyrrolyl, 3-pyrrolyl, 1-pyrazolyl, 3-pyrazolyl, 4-pyrazolyl, 5-pyrazolyl, 1-imidazolyl, 2-imidazolyl, 4-imidazolyl, 5-imidazolyl, 2-oxazolyl, 4-oxazolyl, 5-oxazolyl, 3-isoxazolyl, 4-isoxazolyl, 5-isoxazolyl, 2-thiazolyl, 4-thiazolyl, 5-thiazolyl, 3-isothiazolyl, 4-isothiazolyl, 5-isothiazolyl, 1,3,4-triazol-1-yl, 1,3,4-triazol-2-yl, 1,3,4-triazol-3-yl, 1,2,3-triazol-1-yl, 1,2,3-triazol-2-yl, 1,2,3-triazol-4-yl, 1,2,5-oxadiazol-3-yl, 1,2,3-oxadiazol-4-yl, 1,2,3-oxadiazol-5-yl, 1,3,4-oxadiazol-2-yl, 1,2,5-thiadiazol-3-yl, 1,2,3-thiadiazol-4-yl, 1,2,3-thiadiazol-5-yl, 1,3,4-thiadiazol-2-yl, 2-pyridinyl, 3-pyridinyl, 4-pyridinyl, 1-oxopyridin-2-yl, 1-oxopyridin-3-yl, 1-oxopyridin-4-yl, 3-pyridazinyl, 4-pyridazinyl, 2-pyrimidinyl, 4-pyrimidinyl, 5-pyrimidinyl, 2-pyrazinyl, 1,3,5-triazin-2-yl, 1,2,4-triazin-3-yl, 1,2,4-triazin-5-yl, 1,2,3,4-tetrazin-1-yl, 1,2,3,4-tetrazin-2-yl, 1,2,3,4-tetrazin-5-yl and the like.

An "aromatic ring or ring system" in terms of the present invention is carboaromatic; i.e. it contains no heteroatoms as ring members. It is monocyclic or a condensed system, in which at least one of the rings is aromatic, i.e. conforms to the Hückel 4n+2 π electrons rule. Examples are phenyl, naphthyl, anthracenyl, phenanthrenyl, indanyl, indenyl and fluorenyl.

A "heteroaromatic ring or ring system" in terms of the present invention contains at least one heteroatom or heteroatom group selected from the group consisting of N, O, S, NO, SO and $SO_2$ as ring member. It is monocyclic or a condensed system in which at least one of the rings is aromatic. Examples for monocyclic heteroaromatic rings are the above listed 5- or 6-membered monocyclic heteroaromatic rings. Examples for condensed systems are the following:

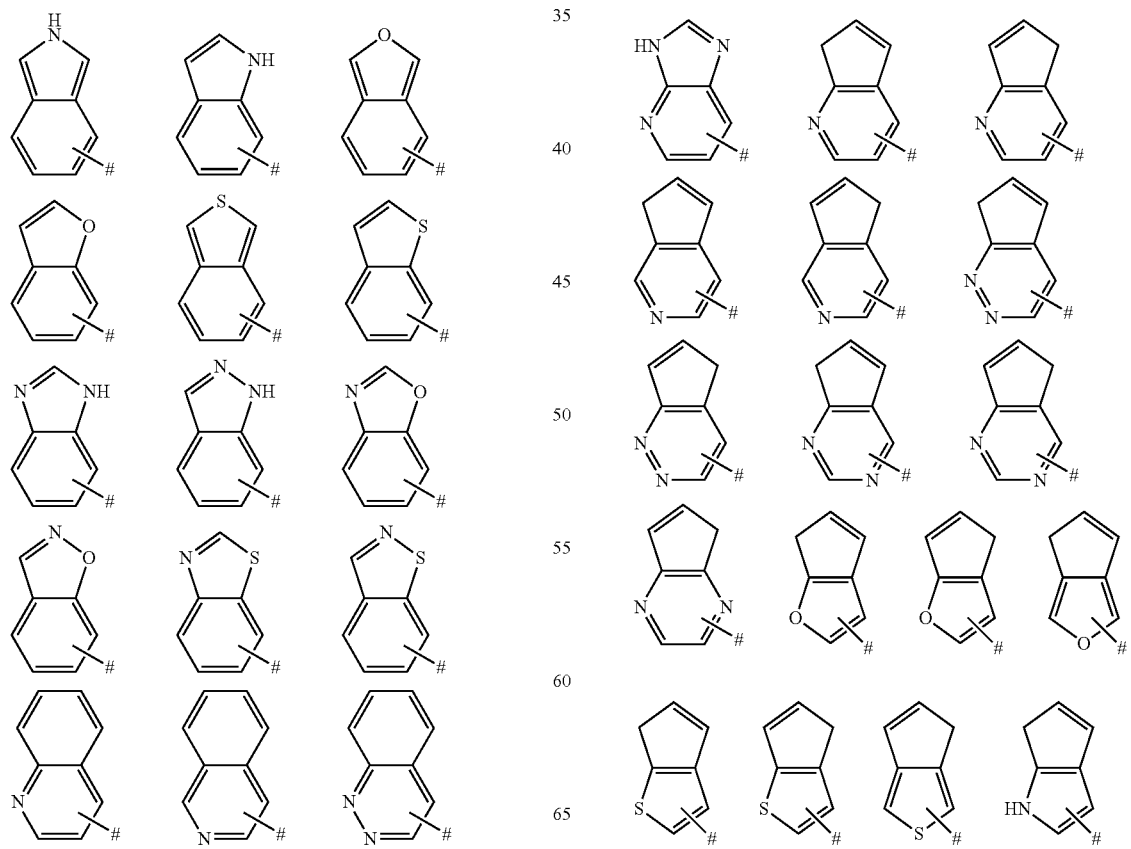

17
-continued
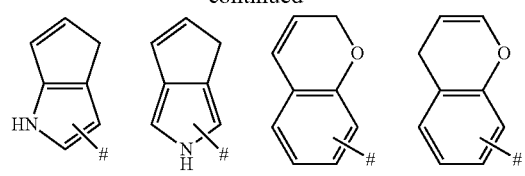
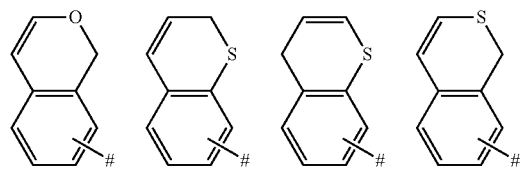
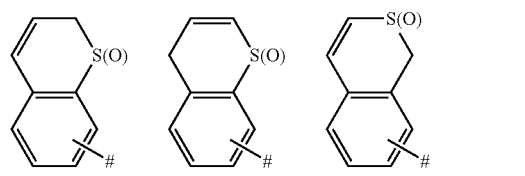
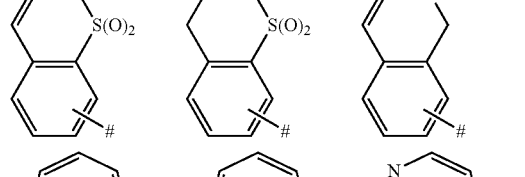
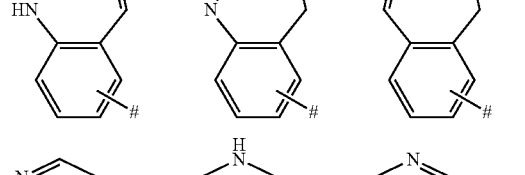
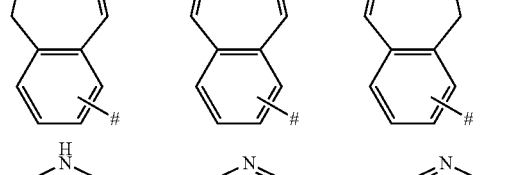
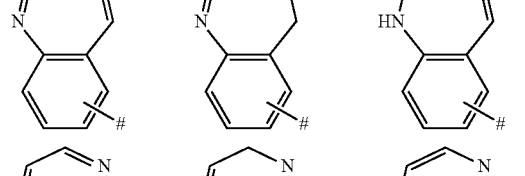
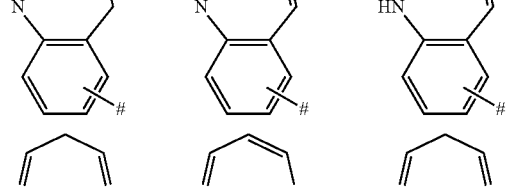
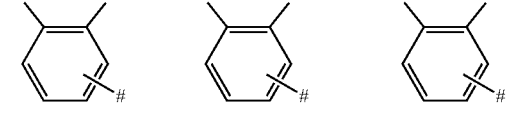
18
-continued
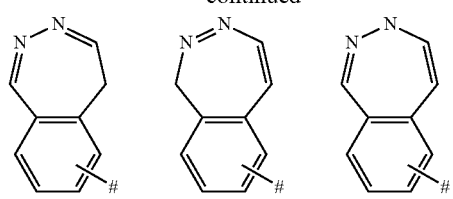
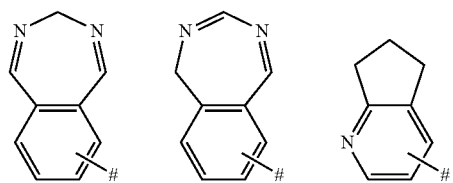
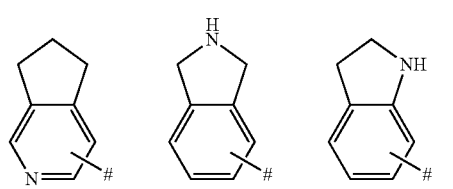
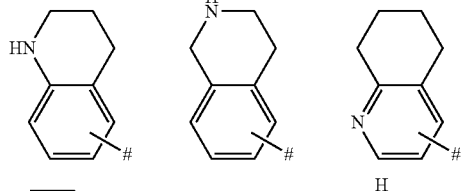
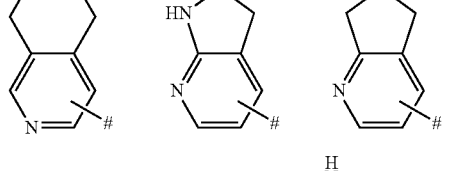
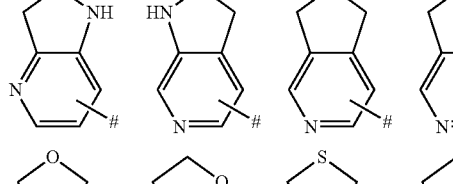
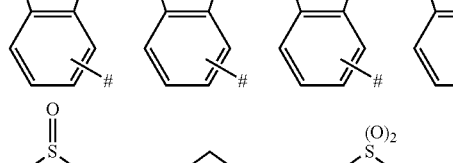
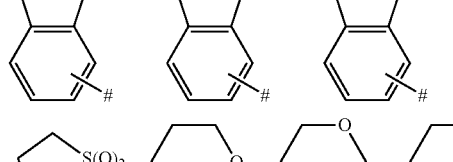
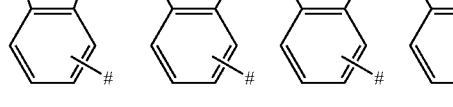

-continued

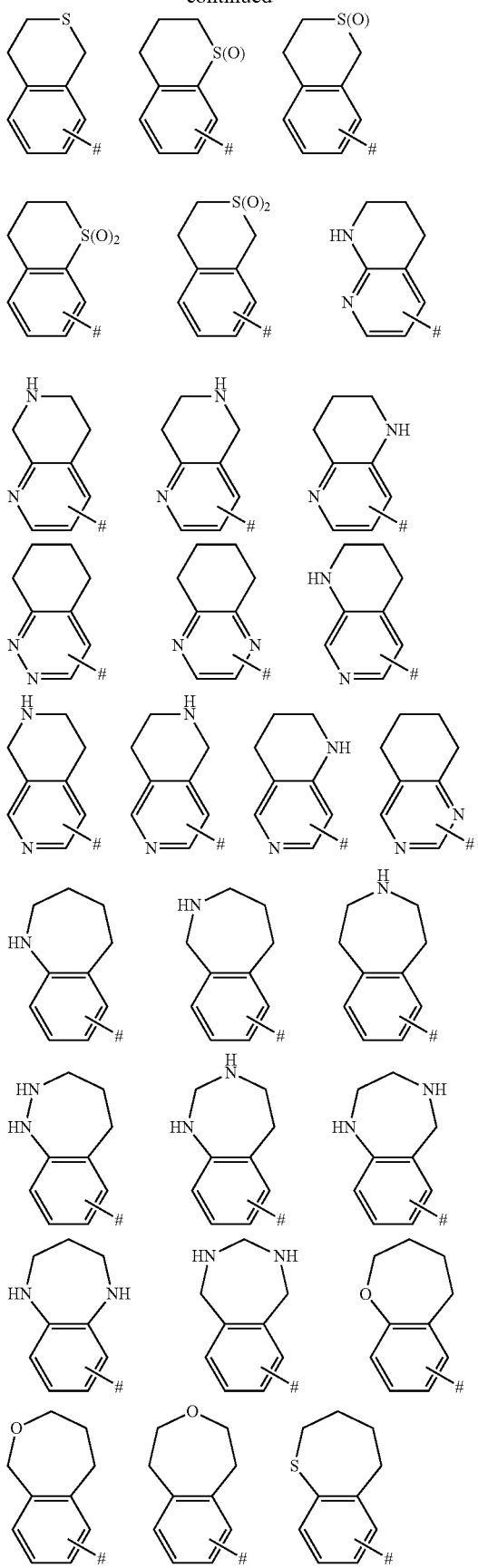

-continued

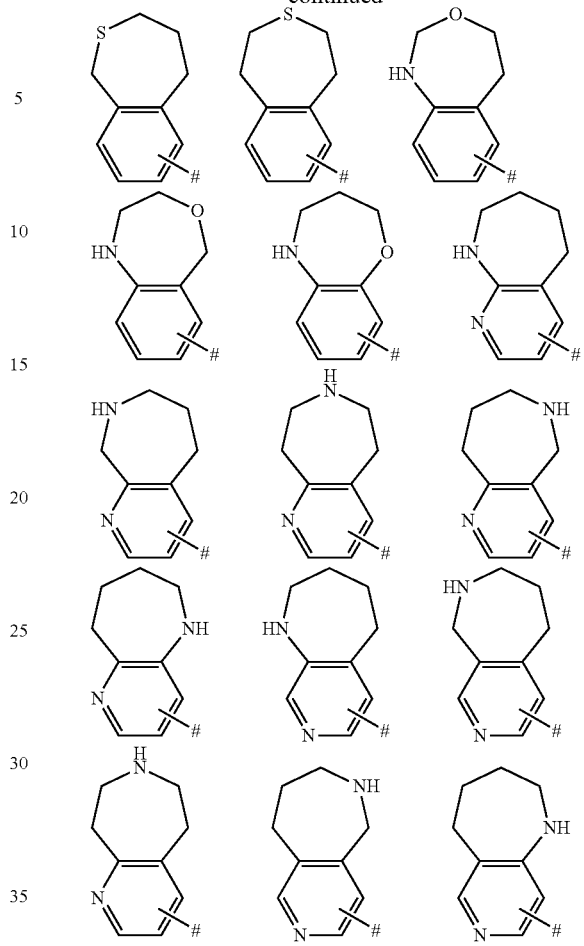

In the above structures # denotes the attachment point to the remainder of the molecule. The attachment point is not restricted to the ring on which this is shown, but can be on either of the two rings, and may be on a carbon or on a nitrogen ring atom. If the rings carry one or more substituents, these may be bound to carbon and/or to nitrogen ring atoms.

The below remarks made to the light stabilizer selected from sterically hindered amines (HALS) in which the amino group carries a basicity-reducing substituent, the antioxidant containing one or more thioether groups, the plasticizer containing carboxylate groups and further optional components contained in the stabilizer composition apply both to the stabilizer composition as well as to the polymer composition of the invention and to their uses and methods of using them.

The below remarks made to the preferred and particular embodiments of the light stabilizer selected from sterically hindered amines (HALS) in which the amino group carries a basicity-reducing substituent, the antioxidant containing one or more thioether groups, the plasticizer containing carboxylate groups, STP or further optional components contained in the compositions of the invention as well as to their uses apply both as taken alone and, in particular, in any conceivable combination with each other.

Sterically Hindered Amines with a Basicity-Reducing Substituent on the Amino Group HALS are derivatives of 2,2,6,6-tetraalkyl piperidine, mostly 2,2,6,6-tetramethyl piperidine, and are well known in the art. If the ring nitrogen atom of the piperidine ring is substituted by hydrogen or alkyl, its basicity is rather high. The basicity can be reduced by appropriate substituents which reduce the electron density on the nitrogen atom. Suitable substituents are for example alkoxy, alkenyloxy, alkynyloxy, cycloalkoxy, phenyloxy or benzyloxy groups and carbonyl or thiocarbonyl groups either bound directly or flexibly in γ- or δ-position to the nitrogen ring atom so that an intramolecular 5- or 6-membered ring can be formed by interaction of N with the C(=O) or C(=S) group. If the carbonyl or thiocarbonyl groups is bound flexibly in γ- or δ-position to the nitrogen ring atom, this results in following bonding situation: N-A-C(=X), where N is the amino nitrogen atom of the HALS, X is O or S and A is a 3- or 4-membered bridging group. The bridging group may be an alkylene group which may contain an oxygen atom, e.g. a group —$(CH_2)_n$— or —$(CH_2)_p$—O—, where O is bound to C(=X), n is 3 or 4 and p is 2 or 3.

In a preferred embodiment (embodiment 1), the sterically hindered amine containing a basicity-reducing substituent on the amino group is selected from the group consisting of compounds of formula I

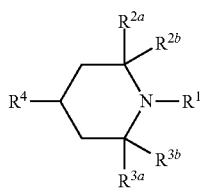

wherein $R^1$ is a group -A-C(=X)—$R^5$ or a group —$OR^6$;

$R^{2a}$, $R^{2b}$, $R^{3a}$ and $R^{3b}$, independently of each other, are $C_1$-$C_3$-alkyl;

$R^4$ is selected from the group consisting of hydrogen, $C_1$-$C_{12}$-alkyl which may carry one or more substituents $R^7$; —$OR^9$, —$S(O)_mR^9$, —$NR^{10a}R^{10b}$, —C(=O)$R^{11}$ and —C(=S)$R^{11}$;

$R^5$ is selected from the group consisting of $C_1$-$C_{12}$-alkyl which may carry one or more substituents $R^7$; —$OR^8$, and —$NR^{10a}R^{10b}$;

$R^6$ is selected from the group consisting of $C_1$-$C_{12}$-alkyl which may carry one or more substituents $R^7$; and —C(=O)—$C_1$-$C_8$-alkyl, where the alkyl moiety may carry one or more substituents $R^7$;

each $R^7$ is independently selected from the group consisting of —$Si(R^{12})_3$, —$OR^8$, —$OSO_2R^8$, —$S(O)_mR^9$, —$N(R^{10a})R^{10b}$, —C(=O)$N(R^{10a})R^{10b}$, —C(=S)N$(R^{10a})R^{10b}$, —C(=O)$OR^8$, —CH=$NOR^8$, $C_3$-$C_6$-cycloalkyl, optionally substituted with one or more substituents $R^{13}$, phenyl, optionally substituted with 1, 2, 3, 4 or 5 substituents $R^{13}$, and a 3-, 4-, 5-, 6- or 7-membered saturated, partially unsaturated or maximally unsaturated heterocyclic ring comprising 1, 2 or 3 heteroatoms or heteroatom groups selected from the group consisting of N, O, S, NO, SO and $SO_2$, as ring members, where the heterocyclic ring is optionally substituted with one or more substituents $R^{13}$;

each $R^8$ is independently selected from the group consisting of from hydrogen, $C_1$-$C_{12}$-alkyl which may carry one or more substituents $R^{14}$; and —C(=O)—$C_1$-$C_{12}$-alkyl, where the alkyl moiety may carry one or more substituents $R^{14}$;

each $R^9$ is independently selected from the group consisting of hydrogen, $C_1$-$C_{12}$-alkyl which may carry one or more substituents $R^{14}$; and $C_1$-$C_{12}$-alkoxy;

$R^{10a}$ and $R^{10b}$, independently of each other and independently of each occurrence, are selected from the group consisting of hydrogen, $C_1$-$C_{12}$-alkyl which may carry one or more substituents $R^{14}$; and $C_1$-$C_{12}$-alkoxy;

each $R^{11}$ is independently selected from the group consisting of hydrogen, $C_1$-$C_{12}$-alkyl which may carry one or more substituents $R^{14}$; and $C_1$-$C_{12}$-alkoxy;

each $R^{12}$ is independently selected from the group consisting of $C_1$-$C_{12}$-alkyl which may carry one or more substituents $R^{14}$; and $C_1$-$C_{12}$-alkoxy;

each $R^{13}$ is independently selected from the group consisting of hydroxyl, cyano, $C_1$-$C_4$-alkyl and $C_1$-$C_4$-alkoxy, or two $R^{13}$ bound on the same carbon atom of a cycloalkyl ring or a heterocyclic ring may form together a group =O;

each $R^{14}$ is independently selected from the group consisting of —$Si(R^{15})_3$, hydroxyl, cyano, $C_1$-$C_{12}$-alkoxy, amino, $C_1$-$C_4$-alkylamino, di-($C_1$-$C_4$-alkyl)-amino, aminocarbonyl, $C_1$-$C_4$-alkylaminocarbonyl, di($C_1$-$C_4$-alkyl)-aminocarbonyl, $C_1$-$C_4$-alkylcarbonyl, $C_1$-$C_4$-alkoxycarbonyl, $C_3$-$C_6$-cycloalkyl, optionally substituted with 1, 2, 3, 4 or 5 substituents $R^{13}$, phenyl, optionally substituted with 1, 2, 3, 4 or 5 substituents $R^{13}$, and a 3-, 4-, 5-, 6- or 7-membered saturated, partially unsaturated or maximally unsaturated heterocyclic ring comprising 1, 2 or 3 heteroatoms or heteroatom groups selected from the group consisting of N, O, S, NO, SO and $SO_2$, as ring members, where the heterocyclic ring is optionally substituted with one or more substituents $R^{13}$;

each $R^{15}$ is independently selected from the group consisting of $C_1$-$C_{12}$-alkyl and $C_1$-$C_{12}$-alkoxy;

A is —$(CH_2)_n$— or —$(CH_2)_p$—O—, where O is bound to C(=X);

X is O or S;

m is 0, 1 or 2;

n is 3 or 4; and p is 2 or 3;

compounds of formula II

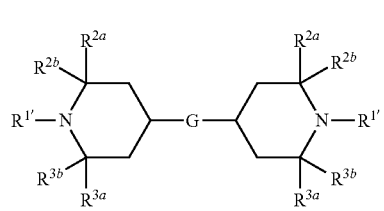

where each $R^{1'}$ has independently one of the meanings given above for $R^1$;

$R^{2a}$, $R^{2b}$, $R^{3a}$ and $R^{3b}$, independently of each other, are as defined above (i.e. independently of each other are $C_1$-$C_3$-alkyl); and G is selected from the group consisting of $C_1$-$C_{10}$-alkylene, —O—$C_2$-$C_{10}$-alkylene-O—, —C(=O)—$C_1$-$C_{10}$-alkylene-C(=O)—, and —O—C(=O)—$C_1$-$C_{10}$-alkylene-C(=O)—O—;

compounds of formula III

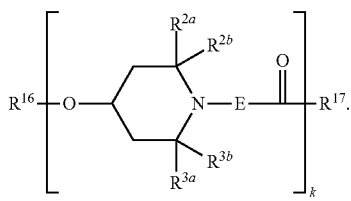

(III)

where

R$^{2a}$, R$^{2b}$, R$^{3a}$ and R$^{3b}$, independently of each other, are as defined above (i.e. independently of each other are C$_1$-C$_3$-alkyl);

E is —(CH$_2$)$_n$—, —(CH$_2$)$_p$—O—, where O is bound to C(=O), —(CH$_2$)$_n$—C(=O)-E$^1$-, or —(CH$_2$)$_p$—O—C(=O)-E$^1$-, where n and p are as defined above (i.e. n is 3 or 4 and p is 2 or 3); and E$^1$ is linear or branched C$_1$-C$_{10}$-alkylene;

R$^{16}$ is hydrogen or C$_1$-C$_4$-alkyl;

R$^{17}$ is hydrogen, C$_1$-C$_4$-alkyl or C$_1$-C$_4$-alkoxy; and k is 2 to 50;

and mixtures thereof.

In compounds I R$^1$ is preferably a group -A-C(=X)—R$^5$ (embodiment 1.1). More preferably (embodiment 1.1.1), R$^1$ is a group -A-C(=X)—R$^5$, where A is —(CH$_2$)$_p$—O—;

X is O;

R$^5$ is C$_1$-C$_{12}$-alkyl; and p is 2 or 3.

In particular (embodiment 1.1.1.1), R$^1$ is a group —(CH$_2$)$_2$—O—C(=O)—R$^5$, where R$^5$ is C$_1$-C$_5$-alkyl; in particular 2,4,4-trimethylpentyl;

R$^{2a}$, R$^{2b}$, R$^{3a}$ and R$^{3b}$ are methyl; and

R$^4$ is a group —O—C(=O)—C$_1$-C$_5$-alkyl; in particular —O—C(=O)-(2,4,4-trimethylpentyl).

In a specific embodiment (embodiment 1.1.1.1.a), the compound of formula I is a compound of formula I.1

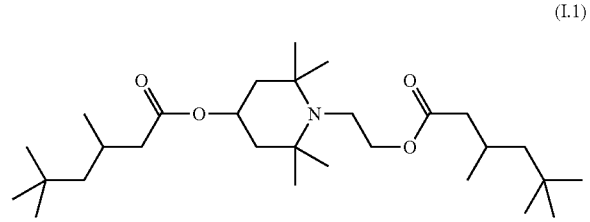 [SMILES: CC(CC(=O)OCCN1C(C)(C)CC(OC(=O)CC(C)CC(C)(C)C)CC1(C)C)CC(C)(C)C]

(I.1)

Preferably (embodiment 1.2), in compounds II each R$^{1'}$ is independently a group —OR$^6$; where R$^6$ is C$_4$-C$_{12}$-alkyl; and G is —O—C(=O)—C$_6$-C$_{10}$-alkylene-C(=O)—O—.

In a specific embodiment (embodiment 1.2.1), the compound of formula II is a compound of formula II.1

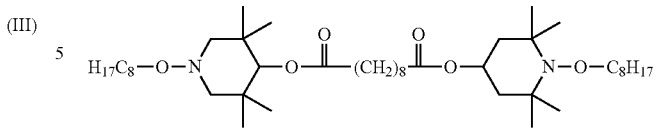

(II.1)

Preferably (embodiment 1.3), in compounds III

E is —(CH$_2$)$_2$—O—C(=O)-E$^1$-, where

E$^1$ is linear or branched C$_2$-C$_4$-alkylene;

R$^{16}$ is hydrogen;

R$^{17}$ is C$_1$-C$_4$-alkoxy; and k is from 8 to 20.

In a specific embodiment (embodiment 1.3.1), the compound of formula III is a compound of formula III.1

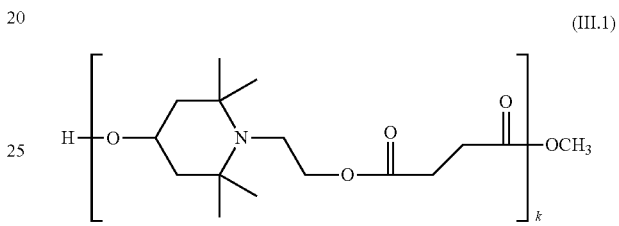

(III.1)

where k is from 8 to 20.

In one preferred embodiment (embodiment 1.4), the sterically hindered amine comprises at least one compound of formula I, where the compound of formula I is as defined in any of embodiments 1, 1.1, 1.1.1, 1.1.1.1 or 1.1.1.1.a. Specifically (embodiment 1.4.1), the sterically hindered amine comprises a compound of formula I.1.

In another preferred embodiment (embodiment 1.5), the sterically hindered amine comprises at least one compound of formula II, where the compound of formula II is as defined in any of embodiments 1, 1.2 or 1.2.1. Specifically (embodiment 1.5.1), the sterically hindered amine comprises a compound of formula II.1.

In yet another preferred embodiment (embodiment 1.6), the sterically hindered amine comprises at least one compound of formula III, where the compound of formula III is as defined in any of embodiments 1, 1.3 or 1.3.1. Specifically (embodiment 1.6.1), the sterically hindered amine comprises a compound of formula III.1.

In another preferred embodiment (embodiment 1.7), the sterically hindered amine comprises at least one compound of formula II and/or at least one compound of formula III, where the compound of formula II is as defined in any of embodiments 1, 1.2 or 1.2.1, and the compound of formula III is as defined in any of embodiments 1, 1.3 or 1.3.1.

In a more preferred embodiment (embodiment 1.8), the sterically hindered amine comprises at least one compound of formula I, where the compound of formula I is as defined in any of embodiments 1, 1.1, 1.1.1, 1.1.1.1 or 1.1.1.1.a, and optionally also at least one compound of formula II and/or at least one compound of formula III, where the compound of formula II is as defined in any of embodiments 1, 1.2 or 1.2.1, and the compound of formula III is as defined in any of embodiments 1, 1.3 or 1.3.1. Specifically (embodiment 1.8.1), the sterically hindered amine comprises a compound of formula I.1 and optionally also a compound of formula II.1 and/or at least one compound of formula III.1.

More specifically (embodiment 1.8.1.1), the sterically hindered amine comprises a compound of formula I.1 and optionally also a compound of formula II.1.

Sterically hindered amines, especially those of formulae I, II and III, and methods for preparing them are known and are for example commercialized under the Tinuvin® brands of BASF SE.

Antioxidant Containing Thioether Groups

The antioxidant containing one or more thioether groups is preferably a hydroxyaromatic compound containing one or more thioether groups. Hydroxyaromatic compounds are carboaromatic or heteroaromatic compounds carrying one or more hydroxyl groups bound to a carboaromatic or heteroaromatic ring. They carry moreover one or more thioether groups. The carboaromatic or heteroaromatic ring may moreover carry further substituents and/or may be fused to one or two saturated or unsaturated carbocyclic or heterocyclic rings. Preferably, the hydroxyaromatic compound containing one or more thioether groups is a phenyl ring carrying one or two hydroxyl groups, one or more thioether groups and optionally one or more further substituents, which are preferably selected from $C_1$-$C_4$-alkyl groups. The thioether group is a group R—S-A-, where A is a bridging group via which the thioether group is bound to the remainder of the molecule, preferably to the hydroxyaromatic ring, and R is an organic radical or may be another bridging group via which the thioether group is bound to another hydroxyaromatic ring. In particular, A is an alkylene group, specifically a $C_1$-$C_{10}$-alkylene group, where the alkylene group may be interrupted by one or more non-adjacent groups —O—, —NH—, —S—, —C(=O)—, —C(=O)NH—, —O—C(=O)—O— or —O—C(=O)—NH—; and R is an alkyl group, specifically $C_1$-$C_{16}$-alkyl, or is a group -A-hydroxyaromatic ring.

In a preferred embodiment (embodiment 2), the antioxidant containing one or more thioether groups is a compound of formula IV

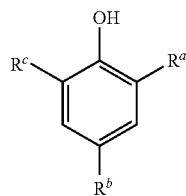

(IV)

where $R^a$, $R^b$ and $R^c$, independently of each other, are selected from $C_1$-$C_4$-alkyl which may carry one or more groups —$SR^{16}$; with the proviso that at least one of $R^a$, $R^b$ and $R^c$ is $C_1$-$C_4$-alkyl which carries one or more groups —$SR^{16}$; where $R^{16}$ is $C_1$-$C_{16}$-alkyl.

More preferably (embodiment 2.1), $R^a$ and $R^b$ are $C_1$-$C_4$-alkyl which carries one or more groups —$SR^{16}$.

In particular (embodiment 2.1.1), $R^a$ and $R^b$ are —$CH_2$—$SR^{16}$; where $R^{16}$ is linear $C_6$-$C_{16}$-alkyl; in particular n-octyl or n-dodecyl; and $R^c$ is methyl;

The compound IV is specifically a compound of formula IV.1 (embodiment 2.1.1.1)

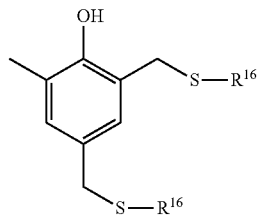

where either both $R^{16}$ are n-octyl or both are n-dodecyl.

Another antioxidant containing one or more thioether groups is for example the compound of formula V

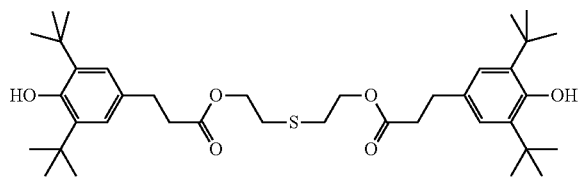

(V)

Preference is however given to compounds IV.

In particular (embodiment 2A) the antioxidant is as defined in embodiment 2 and the sterically hindered amine is as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1 or 1.8.1.1. In another particular embodiment (embodiment 2.1A) the antioxidant is as defined in embodiment 2.1 and the sterically hindered amine is as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1 or 1.8.1.1. In another particular embodiment (embodiment 2.1.1A) the antioxidant is as defined in embodiment 2.1.1 and the sterically hindered amine is as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1 or 1.8.1.1. In another particular embodiment (embodiment 2.1.1.1A) the antioxidant is as defined in embodiment 2.1.1.1 and the sterically hindered amine is as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1 or 1.8.1.1.

Antioxidants containing one or more thioether groups and methods for preparing them are known and are for example commercialized under the Irganox® brands of BASF SE.

Plasticizers Containing Carboxylate Groups

Carboxylate groups in this context refer to carboxylic acid ester groups and not to the salts of carboxylic acids.

The plasticizer (c) is liquid at 25° C. "Liquid at 25° C." in the terms of the present invention means that the plasticizers (c) have a viscosity of at most 250 Pa·s at 25° C. and 1013 mbar, as measured with a CAP 2000+ Viscometer (Brookfield), cone 4, according to DIN EN ISO 3219, annex B at a shear rate of 100 s$^{-1}$. Preferably, the plasticizers have a viscosity of at most 200 Pa·s at 25° C., more preferably of at most 200 Pa·s at 25° C., in particular of at most 150 Pa·s at 25° C., more particularly of at most 100 Pa·s at 25° C., even more particularly of at most 50 Pa·s at 25° C., specifically of at most 10 Pa·s at 25° C., and very specifically of at most 1 Pa·s at 25° C. The viscosities relate to values as obtained with the method described above.

Plasticizers containing carboxylate groups are for example acrylate polymer plasticizers and non-polymeric plasticizers containing carboxylate groups, such as aromatic carboxylates, aliphatic carboxylates or cycloaliphatic carboxylates.

Acrylate Polymer Plasticizers

In a preferred embodiment (embodiment 3) the plasticizer (c) is an acrylate polymer.

In terms of the present invention, "acrylates" and "methacrylates" are esters of acrylic acid and methacrylic acid, respectively, with hydroxyl compounds. Thus, these terms do not include the salts of acrylic or methacrylic acid, unless explicitly specified.

The acrylate polymer plasticizers of component (c) are liquid at 25° C. and 1013 mbar. The acrylate polymers may also contain methacrylates in polymerized form.

Thus, "acrylate polymers" in the terms of the present invention are polymers which contain acrylates (acrylic acid esters) in polymerized form and optionally also contain methacrylates (methacrylic acid esters) in polymerized form. The latter, if present, are generally contained in minor amounts. The acrylate polymers may moreover contain minor amounts of acrylic acid and/or methacrylic acid in copolymerized form. "Minor amounts" in context with (meth)acrylic acid means at most 5% by weight, preferably, at most 3% by weight, based on the total weight of the polymer. If the acrylate polymers are essentially composed of acrylates in polymerized form and contain no methacrylates in polymerized form, they are also denoted as "polyacrylates" in terms of the present invention. The polyacrylates may however contain minor amounts of acrylic acid in copolymerized form. "Essentially composed of" means that the acrylate polymers principally consist of acrylate repeating units, but may also contain minor amounts of acrylic acid in copolymerized form and/or components deriving from the production process, e.g. deriving from starter compounds, chain regulators and the like.

The acrylate polymers, to be more precise the side chains of the acrylate polymers, can be derived from the same or different hydroxyl compounds.

"Liquid at 25° C." in the terms of the present invention means that the acrylate polymers have a viscosity of at most 250 Pa·s at 25° C. and 1013 mbar, as measured with a CAP 2000+ Viscometer (Brookfield), cone 4, according to DIN EN ISO 3219, annex B at a shear rate of 100 s$^{-1}$.

In a preferred embodiment (embodiment 3.1), the plasticizer is selected from acrylate polymers with a viscosity of at most 200 Pa·s at 25° C., more preferably (embodiment 3.1.1) with a viscosity of at most 200 Pa·s at 25° C., in particular (embodiment 3.1.1.1) with a viscosity of at most 150 Pa·s at 25° C., more particularly (embodiment 3.1.1.1.a) with a viscosity of at most 100 Pa·s at 25° C., even more particularly (embodiment 3.1.1.1.b) with a viscosity of at most 50 Pa·s at 25° C., specifically (embodiment 3.1.1.1.c) with a viscosity of at most 10 Pa·s at 25° C., and very specifically (embodiment 3.1.1.1.d) with a viscosity of at most 1 Pa·s at 25° C. The viscosities relate to values as obtained with the method described above.

In a preferred embodiment (embodiment 3.2), the plasticizer is selected from acrylate polymers with a weight-average molecular weight ($M_w$) of at most 30000, e.g. 500 to 30000 or 1000 to 30000, more preferably (embodiment 3.2.1) of at most 25000, e.g. 500 to 25000 or 1000 to 25000, even more preferably (embodiment 3.2.1.1) of at most 20000, e.g. 500 to 20000 or 1000 to 20000, in particular (embodiment 3.2.1.1.a) of at most 10000, e.g. 500 to 10000 or 1000 to 10000, more particularly (embodiment 3.2.1.1.b) of at most 5000, e.g. 500 to 5000 or 1000 to 5000, and specifically (embodiment 3.2.1.1.c) of at most 2000, e.g. 500 to 2000 or 1000 to 2000.

Preferably (embodiment 3.3), the acrylate polymers have a polydispersity ($M_w/M_n$) of from 1 to 10, more preferably (embodiment 3.3.1) of from 1 to 5, in particular of from 1 to 2 (embodiment 3.3.1.1). $M_n$ is the number-average molecular weight.

The values for number-average and weight-average molecular weight are as determined with gel permeation chromatography (GPC), also termed size-exclusion chromatography (SEC), using a polystyrene standard:

Standard: polystyrene (PS) with narrow molar mass standards (PS molar mass range 580-7500000 g/mol, PSS). Hexylbenzene (162 g/mol) was used as a low molar mass marker. Extrapolation was used to estimate the molecular weight distribution outside the range of these calibration standards with respect to the exclusion and permeation limits.

Eluent: THF+0.1% trifluoroacetic acid

Flow rate: 1 mL/min

Injection volume: 100 µl

Concentration: 2 mg/ml

The sample solutions were filtered prior to analysis over Sartorius Minisart SRP 25 (0.2 µm).

Column temperature: 35° C.

Column combination of PLgel pre-column/PLgel MIXED-B

Detector: DRI Agilent 1100

In a preferred embodiment (embodiment 3.4), the plasticizer is selected from acrylate polymers with a glass transition temperature ($T_g$) of at most −40° C., more preferably (embodiment 3.4.1) of at most −45° C., in particular (embodiment 3.4.1.1) of at most −50° C., more particularly (embodiment 3.4.1.1.a) of at most −60° C., and specifically (embodiment 3.4.1.1.b) of at most −65° C.

The glass transition temperature given above refers to values as obtained with $T_g$ method 92/69/EEC A.1 DSC 10° C./min.

In a preferred embodiment (embodiment 3.5), the plasticizer is selected from acrylate polymers with a weight-average molecular weight of at most 30000, a glass transition temperature of at most −40° C. and a viscosity of at most 250 Pa·s at 25° C. In particular (embodiment 3.5.1), the plasticizer is selected from acrylate polymers with a weight-average molecular weight of at most 25000, a glass transition temperature of at most −45° C. and a viscosity of at most 200 Pa·s at 25° C.

If the acrylate polymers contain methacrylate in polymerized form, these are preferably (embodiment 3.6) present in an amount of at most 10% by weight, more preferably (embodiment 3.6.1) at most 5% by weight, in particular (embodiment 3.6.1.1) of at most 2% by weight and specifically (embodiment 3.6.1.1.a) of at most 1% by weight, based on the total weight of the polymer.

In a preferred embodiment (embodiment 3.7), the plasticizer is selected from polyacrylates containing repeating units of formula

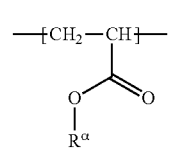

where each $R^\alpha$ is independently $C_1$-$C_6$-alkyl which may carry one substituent selected from the group consisting of hydroxy and $C_1$-$C_4$-alkoxy, and where each $R^\alpha$ is in particular independently selected from the group consisting of $C_1$-$C_6$-alkyl and $C_2$-$C_4$-hydroxyalkyl. In other words, the plasticizer is preferably selected from polymers of acrylic acid esters, where the alcohol from which the acrylic acid esters are derived are selected from compounds of formula $R^\alpha$—OH, where $R^\alpha$ is as defined above. The polyacrylates may contain minor amounts of acrylic acid in copolymerized form.

More preferably (embodiment 3.7.1), the polyacrylates are derived from $C_1$-$C_6$-alkanols, $C_2$-$C_4$-alkanediols and mixtures thereof; i.e. in the above formula each $R^\alpha$ is independently selected from the group consisting of $C_1$-$C_6$-alkyl and $C_2$-$C_4$-hydroxyalkyl.

In particular (embodiment 3.7.1.1), the polyacrylates are either derived from $C_1$-$C_6$-alkanols, specifically n-butanol (in this case the polyacrylate is poly(butylacrylate), or are derived from mixtures of $C_1$-$C_6$-alkanols and $C_2$-$C_4$-alkanediols, specifically from mixtures of n-butanol and ethylene glycol (in this case the polyacrylate is a copolymer of butylacrylate and 2-hydroxyethylacrylate); i.e. the polyacrylates contain repeating units of the above formula wherein each $R^\alpha$ is independently selected from $C_1$-$C_6$-alkyl and is specifically n-butyl (in this specific case the polyacrylate is poly(butylacrylate), or in the polyacrylates in a part of the repeating units $R^\alpha$ is $C_1$-$C_6$-alkyl and is specifically n-butyl, and in another part of the repeating units $R^\alpha$ is $C_2$-$C_4$-hydroxyalkyl and specifically 2-hydroxyethyl (i.e. in a specific case the polyacrylate is a copolymer of butylacrylate and 2-hydroxyethylacrylate).

Specifically (embodiment 3.7.1.2), the polyacrylates are either derived from $C_1$-$C_6$-alkanols, specifically n-butanol (in this case the polyacrylate is poly(butylacrylate), or are derived from mixtures of $C_1$-$C_6$-alkanols and $C_2$-$C_4$-alkanediols, specifically from mixtures of n-butanol and ethylene glycol (in this case the polyacrylate is a copolymer of butylacrylate and 2-hydroxyethylacrylate); i.e. the polyacrylates contain repeating units of the above formula wherein each $R^\alpha$ is independently selected from $C_1$-$C_6$-alkyl and is specifically n-butyl (in this specific case the polyacrylate is poly(butylacrylate), or in the polyacrylates in a part of the repeating units $R^\alpha$ is $C_1$-$C_6$-alkyl and is specifically n-butyl, and in another part of the repeating units $R^\alpha$ is $C_2$-$C_4$-hydroxyalkyl and specifically 2-hydroxyethyl (i.e. in a specific case the polyacrylate is a copolymer of butylacrylate and 2-hydroxyethylacrylate); and contain moreover 1 to 5% by weight, preferably 2 to 3% by weight, based on the total weight of the polymer, acrylic acid in copolymerized form (i.e. repeating units of the above formula wherein $R^\alpha$ is H).

In a particular embodiment (embodiment 3A) the plasticizer is a as defined in embodiment 3 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.1A) the plasticizer is a as defined in embodiment 3.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.1.1A) the plasticizer is a as defined in embodiment 3.1.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.1.1.1A) the plasticizer is a as defined in embodiment 3.1.1.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.1.1.1.aA) the plasticizer is a as defined in embodiment 3.1.1.1.a and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.1.1.1.bA) the plasticizer is a as defined in embodiment 3.1.1.1.b and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.1.1.1.cA) the plasticizer is a as defined in embodiment 3.1.1.1.c and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.1.1.1.dA) the plasticizer is a as defined in embodiment 3.1.1.1.d and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.2A) the plasticizer is a as defined in embodiment 3.2 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.2.1A) the plasticizer is a as defined in embodiment 3.2.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.2.1.1A) the plasticizer is a as defined in embodiment 3.2.1.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.2.1.1.aA) the plasticizer is a as defined in embodiment 3.2.1.1.a and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.2.1.1.bA) the plasticizer is a as defined in embodiment 3.2.1.1.b and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.2.1.1.cA) the plasticizer is a as defined in embodiment 3.2.1.1.c and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.3A) the plasticizer is a as defined in embodiment 3.3 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.3.1A) the plasticizer is a as defined in embodiment 3.3.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.3.1.1A) the plasticizer is a as defined in embodiment 3.3.1.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.4A) the plasticizer is a as defined in embodiment 3.4 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.4.1A) the plasticizer is a as defined in embodiment 3.4.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.4.1.1A) the plasticizer is a as defined in embodiment 3.4.1.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.4.1.1.aA) the plasticizer is a as defined in embodiment 3.4.1.1.1a and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.4.1.1.bA) the plasticizer is a as defined in embodiment 3.4.1.1.1b and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.5A) the plasticizer is a as defined in embodiment 3.5 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.5.1A) the plasticizer is a as defined in embodiment 3.5.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.6A) the plasticizer is a as defined in embodiment 3.6 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.6.1A) the plasticizer is a as defined in embodiment 3.6.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.6.1.1A) the plasticizer is a as defined in embodiment 3.6.1.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.6.1.1.aA) the plasticizer is a as defined in embodiment 3.6.1.1.a and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.7A) the plasticizer is a as defined in embodiment 3.7 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.7.1A) the plasticizer is a as defined in embodiment 3.7.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.7.1.1A) the plasticizer is a as defined in embodiment 3.7.1.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 3.7.1.2A) the plasticizer is a as defined in embodiment 3.7.1.2 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A.

Acrylate polymers fulfilling the above specifications are known and are for example commercialized under the Joncryl® and Acronal® brands of BASF SE.

Non-Polymeric Plasticizers Containing Carboxylate Groups

In another preferred embodiment (embodiment 4) the plasticizer (c) is a non-polymeric plasticizer containing carboxylate groups, such as aromatic carboxylates, aliphatic carboxylates or cycloaliphatic carboxylates.

Aromatic carboxylates are for example $C_4$-$C_{12}$-alkyl phthalates, e.g. bis(2-ethylhexyl)-phthalate.

Aliphatic carboxylates are for example $C_4$-$C_{12}$-alkyl adipates, e.g. bis(2-ethylhexyl)-adipate or bis(2-ethyloctyl)adipate, or $C_4$-$C_{12}$-alkylcitrates, e.g. trisethylcitrate.

Cycloaliphatic carboxylates are for example $C_4$-$C_{20}$-alkyl esters of cyclohexane dicarboxylic acids, in particular 1,2-cyclohexane dicarboxylic acid di-$C_4$-$C_{20}$-alkyl esters, more particularly 1,2-cyclohexane dicarboxylic acid di-$C_4$-$C_{12}$-alkyl esters, specifically 1,2-cyclohexane dicarboxylic acid diisononyl ester (DINCH).

Among the non-polymeric plasticizer preference is given (embodiment 4.1) to cycloaliphatic carboxylates, more preferably (embodiment 4.1.1) to $C_4$-$C_{20}$-alkyl esters of cyclohexane dicarboxylic acids, in particular (embodiment 4.1.1.1) to 1,2-cyclohexane dicarboxylic acid di-$C_4$-$C_{20}$-alkyl esters, more particularly (embodiment 4.1.1.1.a) to 1,2-cyclohexane dicarboxylic acid di-$C_4$-$C_{12}$-alkyl esters, specifically (embodiment 4.1.1.1.b) to 1,2-cyclohexane dicarboxylic acid diisononyl ester.

In a particular embodiment (embodiment 4A) the plasticizer is a as defined in embodiment 4 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 4.1A) the plasticizer is a as defined in embodiment 4.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 4.1.1A) the plasticizer is a as defined in embodiment 4.1.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 4.1.1.1A) the plasticizer is a as defined in embodiment 4.1.1.1 and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 4.1.1.1.aA) the plasticizer is a as defined in embodiment 4.1.1.1.a and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A. In another particular embodiment (embodiment 4.1.1.1.bA) the plasticizer is a as defined in embodiment 4.1.1.1.b and the sterically hindered amine and the antioxidant are as defined in any of embodiments 1, 1.1, 1.1.1, 1.1.1.1, 1.1.1.1a, 1.2, 1.2.1, 1.3, 1.3.1, 1.4, 1.4.1, 1.5, 1.5.1, 1.6, 1.6.1, 1.7, 1.7.1, 1.8, 1.8.1, 1.8.1.1, 2, 2.1, 2.1.1, 2.1.1.1, 2A, 2.1A, 2.1.1A or 2.1.1.1A.

Non-polymeric plasticizer containing carboxylate groups, such as the above-described aromatic carboxylates, aliphatic carboxylates or cycloaliphatic carboxylates, and methods for preparing them are known and commercialized.

The plasticizers (c) are preferably selected from acrylate polymers, in particular from the acrylate polymers described above as preferred, and from cycloaliphatic carboxylates, in particular from cycloaliphatic carboxylates described above as preferred.

Further Components

In a preferred embodiment (embodiment 5), the stabilizing composition of the invention and/or the polymer composition of the invention, in addition to components (a), (b) and (c), further comprises
(d) at least one UV absorber, in particular at least one triazine UV absorber.

The presence of an UV absorber is particularly expedient if the stabilizer or the polymer composition is used in applications which are exposed to UV light, e.g. to sunlight. If the compositions are not used in applications exposed to UV light, e.g. in sealants for flooring, e.g. in parquet flooring, the presence of component (d) can be dispensed with.

Triazine UV Absorbers

Triazine UV absorbers are characterized by containing at least one triazine ring. The triazine ring generally carries at least one hydroxyphenyl ring.

In a preferred embodiment (embodiment 5.1) the UV absorber is a triazine absorber of formula VI

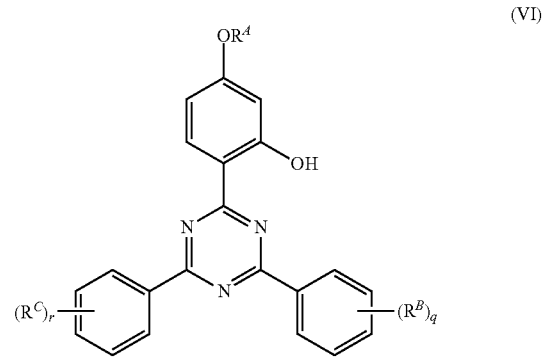

where
$R^A$ is selected from the group consisting of hydrogen and $C_1$-$C_{12}$-alkyl which may carry one or more substituents $R^{17}$;
$R^B$ and $R^C$, independently of each other, are selected from the group consisting of $C_1$-$C_{12}$-alkyl which may carry one or more substituents $R^{17}$; OH and $C_1$-$C_{12}$-alkoxy, where the alkyl moiety in alkoxy may carry one or more substituents $R^{17}$;
each $R^{17}$ is independently selected from the group consisting of OH and $C_1$-$C_{20}$-alkoxy; and
q and r, independently of each other, are 0, 1 or 2.

More preferably (embodiment 5.1.1),
$R^A$ is $C_1$-$C_4$-alkyl which carries two substituents $R^{17}$; where each $R^{17}$ is independently selected from the group consisting of OH and $C_{12}$-$C_{14}$-alkoxy;
where $R^A$ is in particular —$CH_2$—CH(OH)—$CH_2$—O—$C_nH_{2n+1}$, where n is 12 to 14;
$R_B$ and $R^C$, independently of each other, are $C_1$-$C_4$-alkyl, and are in particular methyl; and
q and r are 2.

Specifically (embodiment 5.1.1.1), the UV absorber is a triazine absorber of formula VI.1

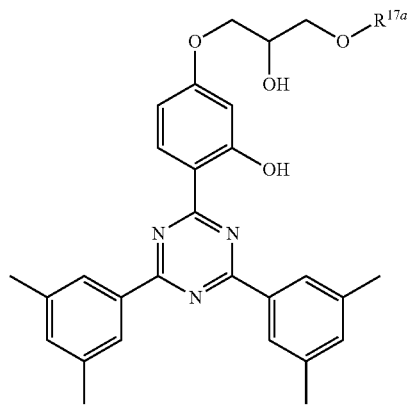

(VI.1)

where $R^{17a}$ is $C_{12}$-$C_{13}$-alkyl.

UV absorbers and methods for preparing them are known and are for example commercialized under the Tinuvin® brands of BASF SE.

In a preferred embodiment (embodiment 6), the stabilizing composition of the invention and/or the polymer composition of the invention, in addition to components (a), (b) and (c), further comprises (e) at least one photolatent or thermally latent initiator.

Photolatent or Thermally Latent Initiators

Photolatent or thermally latent initiators in the terms of the present invention are compounds which under the influence of light, especially UV radiation, or heat are converted into compounds which can act as initiators of a chemical reaction. To be more precise, the photolatent or thermally latent initiators, upon activation, can activate or promote or catalyze the curing or crosslinking of polymers, especially of the polymer(s) contained in the polymer composition of the present invention; specifically the STPs. In inactivated form, the photolatent or thermally latent initiators have no or virtually no effect on the curing or crosslinking of polymers.

The use of photolatent or thermally latent initiators for curing or crosslinking polymers has the advantage that the polymer compositions containing such initiators generally have a good open time (pot life) and simultaneously can be cured on demand.

The condensation of hydrolyzable substituents, such as alkoxy groups, in STPs is catalyzed by bases, but also certain metals or metal complexes.

Accordingly, in a preferred embodiment (embodiment 6.1), the photolatent or thermally latent initiators are selected from the group consisting of photolatent bases and photolatent or thermally latent metal-based initiators.

Photolatent bases (PLBs) are compounds which, when photoactivated, undergo a significant $pK_a$ jump. In inactivated form the photolatent bases are rather weak bases or even neutral compounds. Photoactivation converts them into compounds with a significantly higher basicity.

Generally, the PLBs are precursors of strong nitrogen bases, such as amidines, guanidines, amines (generally secondary amines) or imidazoles. In these precursor compounds, one of the basic nitrogen atoms is substituted by a photolytically cleavable group. This photolytically cleavable group reduces the (Lewis) basicity to such an extent that the precursor compound (i.e. the form in which the nitrogen base carries the photolytically cleavable group) does not act as an initiator. Moreover, in the amidine and also in the guanidine precursor compounds, the C=N double bond is present in reduced form, i.e. as a single bond, so that the PLB is a neutral compound and not an ammonium salt.

The photolytically cleavable group contains a moiety which is capable of absorbing radiation in the UV or visible light range, e.g. in the range of from 200 to 650 nm, and bring about photoelimination of the photolytically cleavable group and thus formation of the active base. The photolytically cleavable group contains generally an aromatic or heteroaromatic ring or ring system which is bound to the nitrogen atom of the base via a (substituted) methylene bridge, a (substituted) methylene-CO-bridge or a (substituted) ethylene bridge. Alternatively the photolytically cleavable group is a (substituted) allyl group. The aromatic or heteroaromatic ring or ring system may be unsubstituted or may carry one or more substituents. Suitable substituents are for example $C_1$-$C_6$-alkyl, $C_1$-$C_6$-alkoxy, $C_1$-$C_6$-alkylthio, $C_1$-$C_6$-alkylsulfinyl, $C_1$-$C_6$-alkylsulfonyl, $C_1$-$C_6$-alkylcarbonyl, $C_1$-$C_6$-alkoxycarbonyl, phenyl and a 3-, 4-, 5-, 6- or 7-membered saturated, partially unsaturated or maximally unsaturated heterocyclic ring comprising 1, 2 or 3 heteroatoms or heteroatom groups selected from the group consisting of N, O, S, NO, SO and $SO_2$, as ring members, where phenyl or the heterocyclic ring is in turn optionally substituted with one or more substituents selected from the group consisting of $C_1$-$C_6$-alkyl, $C_1$-$C_6$-alkoxy, $C_1$-$C_6$-alkylthio, $C_1$-$C_6$-alkylsulfinyl, $C_1$-$C_6$-alkylsulfonyl, $C_1$-$C_6$-alkylcarbonyl and $C_1$-$C_6$-alkoxycarbonyl. Of course, in these groups, the heteroaromatic ring or ring system as well as the 3- to 7-membered saturated, partially unsaturated or maximally unsaturated heterocyclic ring are selected in such a way that their basicity is not such that they can act as an initiator.

In a preferred embodiment (embodiment 6.1.1), the PLBs are selected from compounds $B^1$—$Z^1$, where $B^1$ and $Z^1$ are covalently bound, and where $B^1$ is derived from a strong base selected from the group consisting of amidines, guanidines and secondary amines, and $Z^1$ is a photolytically removable group.

In particular (embodiment 6.1.1.1), the PLBs are selected from the group consisting of compounds of formulae PLB.1 to PLB.7:

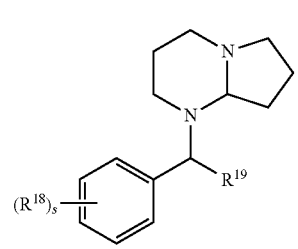

PLB.1

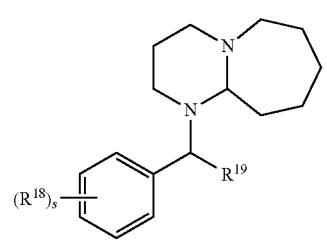

PLB.2

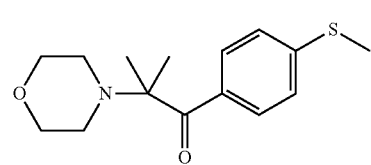

PLB.3

-continued

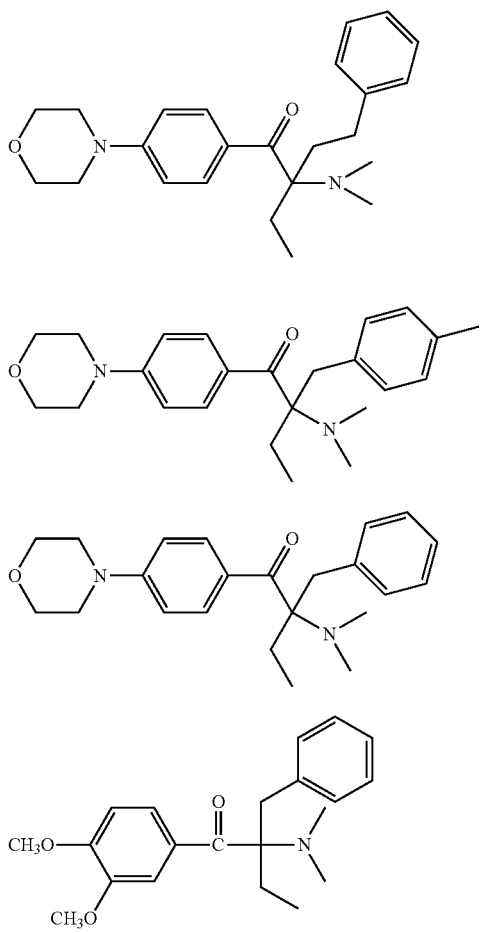

PLB.4

PLB.5

PLB.6

PLB.7 where
each $R^{18}$ is independently selected from the group consisting of $C_1$-$C_6$-alkyl, $C_1$-$C_6$-alkoxy, $C_1$-$C_6$-alkylthio, $C_1$-$C_6$-alkylsulfinyl, $C_1$-$C_6$-alkylsulfonyl, $C_1$-$C_6$-alkylcarbonyl and $C_1$-$C_6$-alkoxycarbonyl;
$R^{19}$ is selected from the group consisting of hydrogen and $C_1$-$C_4$-alkyl; and
s is 0, 1, 2, 3, 4 or 5.

Among these, preference is given (embodiment 6.1.1.1.a) to PLB.1, PLB.2, PLB.4, PLB.5, PLB.6 and PLB.7, more preference to (embodiment 6.1.1.1.b) PLB.1, PLB.2, PLB.6 and PLB.7, and in particular (embodiment 6.1.1.1.c) to PLB.1.

In a particular embodiment of PLB.1 and PLB.2 (embodiment 6.1.1.1.d), $R^{18}$ is $C_1$-$C_6$-alkoxycarbonyl, specifically methoxycarbonyl, s is 0 or 1 and $R^{19}$ is hydrogen. In a specific embodiment, s is 1. Preferably, s is 1 and $R^{18}$ is bound in para-position to $CHR^{19}$. In another specific embodiment, s is 0.

It may be advantageous to use additionally a photosensitizer which eases the photoactivation of the photolytically cleavable group. Suitable photosensitizers are e.g. aromatic ketones, e.g. substituted and unsubstituted benzophenones, thioxanthones, anthraquinones or dyes, like oxazines, acridines, phenazines and rhodamines.

Particularly suitable are substituted benzophenones and thioxanthones. Examples therefor are, in addition to benzophenone and thioxanthone as such, 4,4'-bis(dimethylamino) benzophenone, 4,4'-bis-(diethylamino)benzophenone, 4,4'-bis(ethylmethylamino)benzophenone, 4,4'-diphenylbenzophenone, 4,4'-diphenoxybenzophenone, 4,4'-bis(p-isopropylphenoxy)benzophenone, 4-methylbenzophenone, 2,4,6-trimethylbenzophenone, 4-phenyl benzophenone, 2-methoxycarbonylbenzophenone, 4-benzoyl-4'-methyldiphenylsulfide, 4-methoxy-3,3'-methylbenzophenone, isopropylthioxanthone, chlorothioxanthone, 1-chloro-4-propoxythioxanthone, 2,4-dimethylthioxanthone, 2,4-diethylthioxanthone and 1,3-dimethyl-2-(2-ethylhexyloxy) thioxanthone as well as mixtures of the above compounds.

Further photosensitizers are for example 3-acylcoumarines, e.g. 3-benzoylcoumarine, 3-benzoyl-7-methoxycoumarine, 3-benzoyl-5,7-di(propoxy)coumarine, 3-benzoyl-6,8-dichlorcoumarine, 3-benzoyl-6-chlorcoumarine, 3,3'-carbonylbis[5,7-di(propoxy)coumarine], 3,3'-carbonylbis(7-methoxycoumarine), 3,3'-carbonylbis(7-diethylaminocoumarine), 3-isobutyroylcoumarine, 3-benzoyl-5,7-d imethoxycoumarine, 3-benzoyl-5,7-diethoxycoumarine, 3-benzoyl-5,7-d ibutoxycoumarine, 3-benzoyl-5,7-di (methoxyethoxy)coumarine, 3-benzoyl-5,7-di (allyloxy) coumarine, 3-benzoyl-7-dimethylaminocoumarine, 3-benzoyl-7-diethylaminocoumarine, 3-isobutyroyl-7-dimethylaminocoumarine, 5,7-dimethoxy-3-(1-naphthoyl) coumarine, 5,7-dimethoxy-3-(1-naphthoyl)coumarine, 3-benzoylbenzo[f]coumarine, 7-diethylamino-3-thienoyl-coumarine, or 3-(4-cyanobenzoyl)-5,7-dimethoxycoumarine; or 3-(aroylmethylen)thiazolines, e.g. 3-methyl-2-benzoylmethylennaphthothiazoline, 3-methyl-2-benzoylmethylenbenzothiazoline, or 3-methyl-2-propionylmethylen-p-naphthothiazoline; or other carbonyl compounds, e.g. acetophenone, 3-methoxyacetophenone, 4-phenylacetophenone, 2-acetylnaphtaline, 2-naphthaldehyde, 9,10-anthraquinone, 9-fluorenon, dibenzosuberone, xanthone, 2,5-bis(4-diethylaminobenzylidene)cyclopentanone, 2-(4-dimethylaminobenzylidene)indan-1-one or 3-(4-dimethylaminophenyl)-1-indan-S-yl-propenone, 3-phenylthiophthalimide or N-methyl-3,5-di(ethylthio) phthalimide.

Preference is however given to the thioxanthones, especially to the above substituted thioxanthones.

The photosensitizers are used in an amount of preferably from 0.1 to 3% by weight, in particular from 0.5 to 1.5% by weight, based on the weight of the PLB.

Metal-based photoinitiators are complexes of transition metals or of metals of the third or fourth main-group of the periodic table containing at least one photolytically or thermally removable ligand. In a preferred embodiment (embodiment 6.1.2), they are selected from the group consisting of titanium complexes containing at least one photolytically or thermally removable ligand and aluminum complexes containing at least one photolytically or thermally removable ligand.

Photolytically and/or thermally removable ligands are for example acetylacetonate and dervatives thereof, such as the anions of $C_6H_5C(O)CH_2C(O)C_6H_5$ (dbaH) and of $(CH_3)_3CC(O)CH_2C(O)CC(CH_3)_3$; and certain phenyl groups.

Specifically (embodiment 6.1.2.1) the titanium and aluminum complexes are selected from the group consisting of $Ti(IV)(acac)_2(OiPr)_2$, $Ti(0)(phenyl)_2(2,6-difluoro-4-pyrrol-1-yl-phenyl)_2$, and aluminum tris(acetylacetonate) (Al (acac)$_3$). acac is acetylacetonate; and iPr is isopropyl.

Photolatent or thermally latent initiators and methods for preparing them are known.

In a specific embodiment, the stabilizer composition contains (a) a compound of formula I.1 and additionally also at least one compound of formula II.1 and/or at least one compound of formula III.1;
(b) a compound of formula IV.1;
(c) a plasticizer which is
  (c.1) a butylacrylate or butylacrylate-2-hydroxyethylacrylate copolymer which is liquid at 25° C. and has a weight-average molecular weight of at most 30000, a glass transition temperature of at most −40° C. and a viscosity of at most 250 Pa·s at 25° C.; in particular a weight-average molecular weight of at most 25000, a glass transition temperature of at most −45° C. and a viscosity of at most 200 Pa·s at 25° C.; more particularly a weight-average molecular weight of at most 20000, a glass transition temperature of at most −50° C. and a viscosity of at most 150 Pa·s at 25° C.; specifically a weight-average molecular weight of at most 10000, a glass transition temperature of at most −60° C. and a viscosity of at most 100 Pa·s at 25° C.; more specifically a weight-average molecular weight of at most 5000, a glass transition temperature of at most −65° C. and a viscosity of at most 50 Pa·s at 25° C.; very specifically a weight-average molecular weight of at most 2000, a glass transition temperature of at most −65° C. and a viscosity of at most 10 Pa·s at 25° C.; where specifically the butylacrylate or butylacrylate-2-hydroxyethylacrylate copolymer contains 2 to 3% by weight, based on the total weight of the polymer, of acrylic acid in copolymerized form; or
  (c.2) a $C_4$-$C_{20}$-alkyl esters of a cyclohexane dicarboxylic acid, in particular a 1,2-cyclohexane dicarboxylic acid di-$C_4$-$C_{20}$-alkyl ester, more particularly a 1,2-cyclohexane dicarboxylic acid di-$C_4$-$C_{12}$-alkyl ester, specifically 1,2-cyclohexane dicarboxylic acid diisononyl ester (DINCH);
(d) optionally a triazine UV absorber of formula VI.1;
(e) optionally a photolatent base of formula PLB.1 or PLB.6;
(f) optionally a further additive; especially a filler.

Further additives (f) are described below.

Preferably, the stabilizer composition as well as the polymer composition contains the at least one light stabilizer (a) and the at least one antioxidant (b) in a weight ratio of from 20:1 to 1:20 more preferably of from 10:1 to 1:10, even more preferably of from 6:1 to 1:6 and in particular from 4:1 to 1:4; e.g. of from 4:1 to 1:2 or 4:1 to 1:1 or 2:1 to 1:1 or 1:1.

Preferably, the stabilizer composition as well as the polymer composition contains the at least one light stabilizer (a) and the at least one plasticizer in a weight ratio of from 1:1 to 1:500 more preferably of from 1:1 to 1:300, even more preferably of from 1:5 to 1:300, in particular from 1:10 to 1:300, specifically from 1:10 to 1:100, more specifically from 1:15 to 1:70, and very specifically for the case that the plasticizer is a non-polymeric plasticizer containing carboxylate groups, from 1:15 to 1:25.

The stabilizer composition may contain one or more further additives (f) which are different from components (a) to (e). The further additives (f) are preferably selected among usual additives for stabilizer compositions:

(f.1) antioxidants different from the antioxidants (b) used according to the invention (i.e. containing thioether groups);
(f.2) UV absorbers other than triazine UV absorbers
(f.3) rheology modifiers;
(f.4) desiccants
(f.5) flame retardants
(f.6) radical scavengers
(f.7) metal deactivators
(f.8) antiozonants
(f.9) peroxide decomposers/scavengers
(f.10) blowing agents
(f.11) antistatics
(f.12) adhesion promoters
(f.13) chelates
(f.14) fillers
(f.15) corrosion inhibitors
(f.16) pigments
(f.17) antifoams
(f.18) curing/crosslinking catalysts different from the above-described photolatent or thermally latent initiators (e)

(f.1) Antioxidants different from the antioxidants (b) used according to the invention (i.e. containing thioether groups) are for example phosphorus-containing antioxidants, e.g. Irgafos® 38, Irgafos® 168, Hostanox® P-EPQ or Weston ODPP; or hindered phenolic compounds, such as Irganox® 245, Irganox® 1010, Irganox® 1076, Irganox® 1098, Irganox® 1135, Vulkanox® BHT etc.

(f.2) UV absorbers other than triazine UV absorbers are for example of the class of benzophenones, cyanoacrylates, formamidines, oxanilides or benzotriazoles.

UV absorbers of the class of benzophenones are generally hydroxybenzophenones. These include for example 2-hydroxybenzophenones such as 2-hydroxy-4-methoxybenzophenone, 2,2'-dihydroxy-4-methoxybenzophenone, 2,4-dihydroxy-benzophenone, 2,2',4,4'-tetrahydroxybenzophenone, 2,2'-dihydroxy-4,4'-dimethoxybenzophenone, 2,2'-dihydroxy-4,4'-dimethoxybenzophenone, 2-hydroxy-4-(2-ethyl-hexyloxy)benzophenone, 2-hydroxy-4-(n-octyloxy)benzophenone, 2-hydroxy-4-methoxy-4'-methylbenzophenone, 2-hydroxy-3-carboxybenzophenone, 2-hydroxy-4-methoxybenzophenone-5-sulfonic acid and its sodium salt, and 2,2'-dihydroxy-4,4'-dimethoxybenzophenone-5,5'-bissulfonic acid and its sodium salt.

UV absorbers of the class of cyanoacrylates are generally diphenylcyanoacrylates. These include for example ethyl 2-cyano-3,3-diphenylacrylate, obtainable commercially for example under the name Uvinul® 3035 from BASF AG, Ludwigshafen, 2-ethylhexyl 2-cyano-3,3-diphenylacrylate, obtainable commercially for example as Uvinul® 3039 from BASF AG, Ludwigshafen, and 1,3-bis[(2'-cyano-3',3'-diphenylacryloyl)oxy]-2,2-bis{[2'-cyano-3',3'-diphenylacryloyl)oxy]methyl}propane, obtainable commercially for example under the name Uvinul® 3030 from BASF AG, Ludwigshafen.

Oxanilides are for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, and also mixtures of ortho-, para-methoxy-disubstituted oxanilides and mixtures of ortho- and para-ethoxy-disubstituted oxanilides.

Benzotriazoles includes for example 2-(2'-hydroxyphenyl)-benzotriazoles such as 2-(2'-hydroxy-5'-methylphenyl)benzotriazole, 2-(3',5'-di-tert-butyl-2'-hydroxy-phenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)-benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5- chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl) phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole and 2-(3'-tert-butyl-2'-hydroxy-5'-(2-isooctyloxy-carbonylethyl) phenylbenzotriazole, 2,2'-methylenebis[4-(1,1,3,3-tetramethylbutyl)-6-benzotriazol-2-ylphenol]; the product of esterifying 2-[3'-tert-butyl-5'-(2-methoxycarbonylethyl)-2'-hydroxyphenyl]-2H-benzotriazole with polyethylene glycol 300; $[R-CH_2CH_2-COO(CH_2)_3]_2$ where R=3'-tert-butyl-4'-hydroxy-5'-2H-benzotriazol-2-ylphenyl, and mixtures thereof.

(f.3) Rheology modifiers are for example thixotropic agents, like polyamide waxes, hydrogenated castor oil derivatives, metal soaps (e.g. calcium, barium or aluminum stearate), fatty acid amides and swellable polymers like PVC.

(f.4) Desiccants are for example silica, zeolithes, calcium sulfate, sodium sulfate and various silanes, such as vinylsilanes (e.g. vinyltrimethoxysilane), oxime silanes, benzamidosilanes, carbamatosilanes and alkoxysilanes.

(f.5) Flame retardants are for example halogen containing compounds such as tetrabromobisphenol A, decabromodiphenyl oxide, decabromodiphenyl ethane, brominated carbonate oligomers, brominated epoxy oligomers, and poly (bromostyrenes). Further examples are the hydroxides, oxides and oxide hydrates of group 2, 4, 12, 13, 14 and 15 (semi)metals, such as magnesium oxide or hydroxide, aluminium oxide, aluminum trihydrate, silica, tin oxide, antimony oxide (Ill and V) and oxide hydrate, titanium oxide and zinc oxide or oxide hydrate; nitrogen-based flame retardants, such as melamine and urea based resins and melamine cyanurate, melamine phosphates, melamine polyphosphates and melamine borate; and phosphorous-based flame retardants, such as ammonium polyphosphates, phosphoric esters, in particular triarylphosphates, such as triphenyl phosphate, tribenzyl phosphate, tricresyl phosphate, tri-(dimethylphenyl) phosphate, benzyl dimethylphosphate, di-(dimethylphenyl) phenyl phosphate, resorcinol-bis(diphenyl phosphate), recorcinol-bis-[di-(2,6-dimethylphenyl)-phosphate] (PX-200), aluminum diethylphosphinate (Exolit® OP 1230), but also aliphatic phosphates, such as tris(2-chloroisopropyl)phosphate (Lupragen® TCPP), aromatic polyphosphates, e.g. polyphosphates derived from bisphenols, such as the compounds described in US 2004/0249022), and phosphonic esters, such as dimethyl-methyl phosphonate and phosphonic acid (2-((hydroxymethyl)carbamyl)ethyl) dimethylester, and polycyclic phosphorous-containing compounds, such as 9,10-dihydro-9-oxa-10-phosphaphenanthrene-10-oxide (DOPO).

(f.6) Radical scavengers are for example nitroxyl compounds, such as 2,2,6,6-tetramethylpiperidinyloxyl (TEMPO) and derivatives thereof or hydroxylamines, such as NRR'OH, where R and R', independently of each other, are long-chain alkyl groups, e.g. alkyl groups with 4 to 20 carbon atoms; aryl amines, e.g. diphenyl amines in which at least one of the phenyl rings carries a $C_1$-$C_{10}$-alkyl group; or quinone compounds.

(f.7) Metal deactivators are, for example, salicylic acid derivatives such as N,N'-disalicylidene-1,2-propanediamine, N-salicylal-N'-salicyloyl hydrazine, N,N'-bis(salicyloyl)hydrazine, 3-salicyloylamino-1,2,4-triazole, N,N'-bis (salicyl-oyl)oxalyl dihydrazide, or N,N'-bis(salicyloyl) thiopropionyl dihydrazide; hydrazine derivatives, such as N,N-bis(3,5-di-tert-butyl-4-hydroxyphenylpropionyl)hydrazine, bis(benzylidene)oxalyl dihydrazide, isophthaloyl dihydrazide, sebacoyl bisphenylhydrazide, or N,N'-diacetyladipoyl dihydrazide, further N,N'-diphenyloxamide or oxanilide, and moreover benzotriazoles or tolutriazoles, as commercialized under the Irgamet® brand of BASF.

(f.8) Antiozonants are added in order to slow the deterioration of the finished product caused by exposure to ozone. Examples are p-phenylenediamines such as 6PPP (N-(1,3-dimethylbutyl)-N'-phenyl-p-phenylenediamine) or IPPD (N-isopropyl-N'-phenyl-p-phenylenediamine); 6-ethoxy-2,2,4-trimethyl-1,2-dihydroquinoline (ETMQ), ethylene diurea (EDU), nickel dibutyl dithiocarbamate or paraffin waxes, such as Akrowax® 195.

(f.9) Peroxide deactivators (decomposers/scavengers) are for example esters of 8-thiodipropionic acid, for example, the lauryl, stearyl, myristyl or tridecyl ester, mercaptobenzimidazole or the zinc salt of 2-mercaptobenzimidazole, zinc dibutyldithiocarbamate, dioctadecyl disulfide, and pentaerythritol tetrakis(8-dodecylmercapto)propionate.

(f.10) Suitable blowing agents are chemical blowing agents, which are compounds which decompose at elevated temperature to release gas. Examples are chlorinated paraffin waxes, carbamoyliminourea or [(4-methylphenyl)sulfonylamino]urea.

(f.11) Antistatics are used for reducing or eliminating buildup of static electricity. The antistatic agent makes the surface or the material itself slightly conductive, either by being conductive itself, or by absorbing moisture from the air; therefore, some humectants are suitable. The molecules of an antistatic agent often have both hydrophilic and hydrophobic areas. Examples are long-chain aliphatic amines (optionally ethoxylated) and amides, quaternary ammonium salts (e.g., behentrimonium chloride or cocamidopropyl betaine), esters of phosphoric acid, polyethylene glycol esters, or polyols; further carbon black, conductive fibers, or nanomaterials; ionic liquids or a solution of a salt in an ionic liquid; moreover indium tin oxide.

(f.12) An adhesion promoter is understood to be a substance which improves the adhesion properties (tack or stickiness) of adhesive layers on surfaces; such compounds are also known as tackifiers. Usually they are low-molecular weight compounds with high glass transition temperature. Examples for adhesion promotors useful in sealant compositions are silane adhesion promoters, in particular aminosilanes, e.g. 3-aminopropyltrimethoxysilane, and also polyethyleneimines, especially polyethyleneimines with a weight average molecular weight of at most 10000, in particular at most 5000. Examples for adhesion promotors useful in adehesive compositions are resins, terpene oligomers, coumarone/indene resins, aliphatic, petrochemical resins and modified phenolic resins. Suitable within the framework of the present invention are, for example, hydrocarbon resins, as obtained by polymerization of terpenes, principally α- or β-pinene, dipentene or limonene. The polymerization of these monomers generally takes place cationically with initiation by Friedel-Crafts catalysts. The terpene resins also include copolymers of terpenes and other monomers, e.g. styrene, α-methylstyrene, isoprene and the like. The above resins are used e.g. as adhesion promoters for pressure-sensitive adhesives and coating materials. Also suitable are the terpene-phenolic resins which are produced by acid-catalyzed addition of phenols to terpenes or rosin. Further, rosins and derivatives thereof, for example their esters or alcohols, are suitable as adhesion promoters in the above sense. Silane adhesion promoters, in particular aminosilanes, e.g. 3-aminopropyltrimethoxysilane, are also suitable; as well as polyethyleneimines, especially polyethyleneimines with a weight average molecular weight of at most 10000, in particular at most 5000.

(f.13) Chelates serve for binding metals which may otherwise influence the properties of the composition of the invention in an unintentional way at an inappropriate time. Examples are acetylacetone (acac), ethylenediamine (en), 2-(2-aminoethylamino)ethanol (AEEA), diethylenetriamine (dien), iminodiacetate (ida), triethylenetetramine (trien, TETA), triaminotriethylamine (tren), nitrilotriacetate (nta), bis(salicyliden)ethylenediamine (salen), ethylenediaminotriacetate (ted), ethylenediaminetetraacetate (EDTA), diethylenetriaminepentaacetate (DTPA), 1,4,7,10-tetraazacyclododecan-1,4,7,10-tetraacetate (DOTA), oxalate (ox), tartrate (tart), citrate (cit), dimethylglyoxim (dmg), 8-hydroxyquinoline (oxin), 2,2'-bipyridine (bpy), 1,10-phenanthroline (phen), dimercaptosuccinic acid (DMSA) or 1,2-bis(diphenylphosphino)ethane (dppe).

(f.14) Fillers are for example inorganic fillers like calcium carbonate, e.g. in the form of chalk or lime dust; talc, clay, sand, quartz, flint, mica, glass powder and other ground mineral substances, ceramic microspheres, precipitated or pyrogenic silica, zeolithes, bentonites, kaolin, kieselguhr, metal oxides like titanium, iron or zinc oxide; mixed oxides of silicium and aluminum; barium sulfate, silicium nitride, silicium carbide, boron nitride, carbon black; or organic fillers like graphite powder, wood flour, sawdust, ground walnut shells and other chopped fibers like cellulose or cotton fibers.

(f.15) Corrosion inhibitors are for example the alkali metal or (substituted) ammonium salts or polycarboxylic acid, such as the salts of sebacic acid or tris(carboxyalkylamino)-1,3,5-triazines; or N-acylsarcosines. These compounds are commercialized under the Irgacor® brand of BASF.

(f.16) Pigments are for example titanium dioxide, iron oxides or carbon black.

(f.17) Antifoams or antifoaming agents of defoamers are intended to stop or suppress foaming during processing. Typically silicones, such as dimethylsilicones, are used.

(f.18) Curing/crosslinking catalysts different from the above-described photolatent or thermally latent initiators are for example tin-based catalysts, such as dibutyltin dilaurate (DBTL), dibutyltin dioctoate or dibutyltin diacetylacetonate, or organozinc compounds.

Among the above components (f), preference is given to the fillers (f.14). The fillers are preferably colorless. Preference is given to calcium carbonate, talc, quartz, mica, glass powder and other ground mineral substances, ceramic microspheres, precipitated or pyrogenic silica, zeolithes, bentonites, kaolin, kieselguhr and titanium oxide. Specifically, calcium carbonate is used.

In a particular embodiment, the stabilizer composition of the invention is characterized by not containing any curing/crosslinking catalyst based on tin (e.g. the above-mentioned, usually present dibutyltin dilaurate (DBTL) or dibutyltin dioctoate or dibutyltin diacetylacetonate) and more particularly by not containing any metal-based curing/crosslinking catalyst.

In a preferred embodiment the stabilizer composition contains following components in following ratios:
(a) at least one light stabilizer selected from sterically hindered amines (HALS) in which the amino group carries a basicity-reducing substituent: 0.1 to 10% by weight;
(b) at least one antioxidant containing one or more thioether groups: 0.1 to 10% by weight;
(c) at least one plasticizer which is liquid at 25° C. and which is selected from plasticizers containing carboxylate groups: 10 to 99.8% by weight;
(d) at least one UV absorber, in particular at least one triazine UV absorber: 0 to 10% by weight;
(e) at least one photolatent or thermally latent initiator: 0 to 5% by weight;
(f) at least one further additive: 0 to 89.8% by weight.

The percentages by weight are based on the total weight of the stabilizer composition. The weights from (a) to (f) add up to 100% by weight.

Preferably, the stabilizer composition is liquid at 25° C. and 1013 mbar and contains at most 5% by weight, in particular at most 2% by weight, based on the total weight of the composition, of solvents.

In analogy to what has been said above, "liquid at 25° C. and 1013 mbar" in the terms of the present invention means that the stabilizer composition has a viscosity of at most 250 Pa·s at 25° C. and 1013 mbar, as measured with a CAP 2000+ Viscometer (Brookfield), cone 4, according to DIN EN ISO 3219, annex B at a shear rate of 100 s$^{-1}$. In particular, the stabilizer composition has a viscosity of at most 200 Pa·s at 25° C., in particular a viscosity of at most 150 Pa·s at 25° C., more particularly a viscosity of at most 100 Pa·s at 25° C., even more particularly a viscosity of at most 50 Pa·s at 25° C., specifically a viscosity of at most 10 Pa·s at 25° C., and very specifically a viscosity of at most 1 Pa·s at 25° C. The viscosities relate to values as obtained with the method described above.

"Solvent" is a liquid substance that dissolves a solute (a chemically different liquid, solid or gas), resulting in a solution. In terms of the present invention, the solvent is not restricted to a compound or medium which dissolves the solutes in the proper sense: This compound or medium may be more generally a dispersing medium, and thus the "solution" might be a suspension, emulsion or a solution in the proper sense (i.e. a homogeneous mixture composed of two or more substances, where the particles of the solute cannot be seen by naked eye and which does not scatter light). As used above, the term "solvent" does not include any of components (a) to (e), even if these are liquid and may principally act as a solvent for one or more of the other components. As used above, this term includes only liquid substances which are different from components (a) to (e) and are able to dissolve a solute.

The stabilizer composition is prepared by principally known methods, such as intimately mixing the components, either simultaneously or consecutively, in suitable dispersing units, such as mixers, in particular high-speed mixers, planetary mixers, internal mixers, compounders, twin-screw-extruders etc.

Polymer Composition

The present invention further relates to a polymer composition comprising
(i) at least one silyl-terminated polymer; and
(ii) a stabilizer composition as defined above.

In other words, the polymer composition comprises
(i) at least one silyl-terminated polymer;
(ii) (a) at least one light stabilizer selected from sterically hindered amines (HALS) in which the amino group carries a basicity-reducing substituent;
(b) at least one antioxidant containing one or more thioether groups; and (c) at least one plasticizer which is liquid at 25° C. and which is selected from plasticizers containing carboxylate groups.

The polymer composition may moreover further comprise one or more of the above components (d) to (f).

The above general definitions and description of preferred embodiments of components (a) to (f) apply here, too.

Silyl-Terminated Polymers

Silyl-terminated polymers (STPs) are polymers, generally with an organic backbone, which contain silyl groups at the termini (chain ends) of the polymers. Generally, at least one of the substituents on the silicium atom is a hydrolysable group, especially an alkoxy group. In the presence of atmospheric moisture such alkoxysilyl-terminated polymers are capable of undergoing hydrolyzation/condensation reactions with each other, which results in a curing or crosslinking of the polymers. The polymer backbone of the STPs is generally a polyether, polyester, polyamide, polyimine, polyurethane, poly(meth)acrylate, polyvinylester, polyolefin or mixed forms thereof.

STPs and methods for producing them are generally known and are inter alia described in US 2012/0238695, DE-A-102011003425, DE-A-102004018548 and the references cited therein.

Preference is given to STPs with a weight-average molecular weight $M_w$ of from 350 to 30000, more preferably from 500 to 25000, even more preferably from 1000 to 22000, in particular from 5000 to 20000, specifically from 7000 to 19000.

The number-average and weight-average molecular weights of STPs are as determined by the above described GPC/SEC method using polystyrene standards.

In a preferred embodiment, the silyl-terminated polymer is a polymer of formula VI:

$$[(R')_a(R''O)_{3-a}Si-L^1-Y]_b—Po \qquad (VI)$$

where

Po is the di-, tri- or tetravalent radical of a base polymer;
each Y is independently selected from the group consisting of a bond, —NH—C(=O)—O—, —O—C(=O)—NH—, —C(=O)—NH-L²-NH—C(=O)—NH—, —NH—C(=O)—NH-L²-NH—C(=O)—, —O—C(=O)—, —C(=O)—O—, —NH—C(=O)—S—, —S—C(=O)—NH— and —O—;
R' and R", independently of each other and independently of each occurrence, are selected from $C_1$-$C_6$-alkyl;
$L^1$ is $C_1$-$C_4$-alkylene
$L^2$ is a divalent aliphatic, cycloaliphatic or aromatic radical;
each a is independently 0 or 1; and
b is 2, 3 or 4.

If Po ends in an oxygen atom, this is not directly bound to an oxygen atom of Y. In this case, the oxygen atom of Y is to be understood to be omitted. If for instance the terminal group of Po is an oxygen atom and Y is —O—C(=O)—NH—, the group Y bound to this oxygen atom of Po is to be understood in this case to be —C(=O)—NH—, so that Po—Y is in the case in sum Po—O—C(=O)—NH—.

In a preferred embodiment, Po is the di-, tri- or tetravalent radical of a polymer selected from the group consisting of polyethers, polyesters, polyamides, polyimines, polyurethanes, poly(meth)acrylates, polyvinylesters, polyolefins and mixed forms thereof.

Polyether polymers from which Po is derived are preferably composed of repeating units

where each A is independently —CH₂—CH₂—, —CH₂—CH(CH₃)—, —CH(CH₃)—CH₂—, or —(CH₂)₄—; i.e. they are derived from polyethyleneglycol, polypropyleneglycol, poly-tetrahydrofuran and mixed forms (copolymers) thereof.

Polyesters from which Po is derived are preferably composed of repeating units

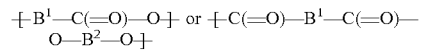

where $B^1$ and $B^2$, independently of each other, are a divalent aliphatic, alicyclic, aliphatic-alicyclic, aromatic or araliphatic radical.

Polyamides from which Po is derived are preferably composed of repeating units

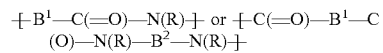

where $B^1$ and $B^2$, independently of each other, are a divalent aliphatic, alicyclic, aliphatic-alicyclic, aromatic or araliphatic radical and R is H or $C_1$-$C_4$-alkyl or is a branching point and stands for example for —[B¹—C(=O)—N(R)—] or —[C(=O)—B¹—C(O)—N(R)—B²—N(R)—] or —[B²—N(R)—C(=O)—B¹—C(O)—].

Polyimine polymers from which Po is derived are preferably composed of repeating units —[A-N(R)—], where each A is independently a divalent aliphatic, alicyclic, aliphatic-alicyclic, aromatic or araliphatic radical and R is H or $C_1$-$C_4$-alkyl or is a branching point and stands for example for —[A-N(R)—].

Polyurethanes from which Po is derived are preferably composed of repeating units

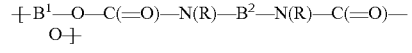

where $B^1$ and $B^2$, independently of each other, are a divalent aliphatic, alicyclic, aliphatic-alicyclic, aromatic or araliphatic radical and R is H or $C_1$-$C_4$-alkyl or is a branching point.

Poly(meth)acrylates from which Po is derived are preferably composed of repeating units

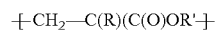

where R is H (polyacrylates) or methyl (methacrylates) and R' is $C_1$-$C_{12}$-alkyl which may carry various substituents, such as OH, $C_1$-$C_4$-alkoxy, amino, $C_1$-$C_4$-alkylamino, di-($C_1$-$C_4$)-alkylamino, CN, trimethylsilyl etc.

Polyvinylesters from which Po is derived are preferably composed of repeating units

where R is $C_1$-$C_{12}$-alkyl.

Polyolefins from which Po is derived are preferably polymers of α-olefins and are preferably composed of repeating units

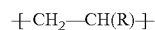

where R is H $C_1$-$C_{12}$-alkyl.

In particular, Po is the divalent radical (i.e. b is 2) of a polyether. The polyether is in particular a polyethylene glycol or polypropylene glycol, and is specifically polypropylene glycol.

In a particular embodiment, in polymer VI
Y is —NH—C(=O)—O— (where NH is bound to $L^1$);
R' and R", independently of each other and independently of each occurrence, are selected from the group consisting of methyl and ethyl and are in particular methyl; and each $L^1$ is independently —$CH_2$— or $C_3$-alkylene, in particular —$CH_2$— or —$CH_2CH_2CH_2$—.

In a specific embodiment, polymer VI is a polymer of formula VI.1

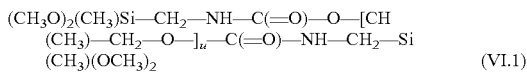
(VI.1)

where u is from 1 to 500, preferably 10 to 400, more preferably 50 to 300, in particular from 100 to 250, specifically from 100 to 200, very specifically from 120 to 180.

In another specific embodiment, polymer VI is a polymer of formula VI.2

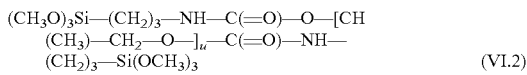
(VI.2)

where u is from 1 to 500, preferably 10 to 400, more preferably 50 to 400, in particular from 100 to 350, specifically from 200 to 350, very specifically from 200 to 310.

Such STPs are known and sold, for example under the Geniosil® brands from Wacker (e.g. Geniosil® STP-E 10 or Geniosil® STP-E 35)

Preferably, the polymer composition contains the at least one light stabilizer (a) and the at least one silyl-terminated polymer (i) in a weight ratio of from 1:10 to 1:1000, more preferably of from 1:20 to 1:500, even more preferably of from 1:50 to 1:400, in particular from 1:50 to 1:300, specifically from 1:70 to 1:200.

In a preferred embodiment the polymer composition contains following components in following ratios:
(i) at least one silyl-terminated polymer: 10 to 94.9% by weight;
(a) at least one light stabilizer selected from sterically hindered amines (HALS) in which the amino group carries a basicity-reducing substituent: 0.05 to 10% by weight;
(b) at least one antioxidant containing one or more thioether groups: 0.05 to 10% by weight;
(c) at least one plasticizer which is liquid at 25° C. and which is selected from plasticizers containing carboxylate groups: 5 to 89.9% by weight;
(d) at least one UV absorber, in particular at least one triazine UV absorber: 0 to 10% by weight;
(e) at least one photolatent or thermally latent initiator: 0 to 5% by weight;
(f) at least one further additive: 0 to 84.9% by weight.

The percentages by weight are based on the total weight of the polymer composition. The weights of (i) and (a) to (f) add up to 100% by weight.

Preferably, the polymer composition is liquid at 25° C. and 1013 mbar and contains at most 5% by weight, in particular at most 2% by weight, based on the total weight of the composition, of solvents. This allows applying the polymer composition in very convenient ways, for example even by spray application, without the necessity of heating and without the necessity to remove solvents. A further advantage is that the polymer composition, contrary to hot melt adhesive compositions, can be applied to thermally sensitive substrates. Moreover, the composition can be applied to substrates sensitive to solvents, especially organic solvents.

In analogy to what has been said above, "liquid at 25° C. and 1013 mbar" in the terms of the present invention means that the polymer composition has a viscosity of at most 250 Pa·s at 25° C. and 1013 mbar, as measured with a CAP 2000+ Viscometer (Brookfield), cone 4, according to DIN EN ISO 3219, annex B at a shear rate of 100 s$^{-1}$. In particular, the stabilizer composition has a viscosity of at most 200 Pa·s at 25° C., in particular a viscosity of at most 150 Pa·s at 25° C., more particularly a viscosity of at most 100 Pa·s at 25° C., even more particularly a viscosity of at most 50 Pa·s at 25° C., specifically a viscosity of at most 10 Pa·s at 25° C., and very specifically a viscosity of at most 1 Pa·s at 25° C. The viscosities relate to values as obtained with the method described above.

"Solvent" is a liquid substance that dissolves a solute (a chemically different liquid, solid or gas), resulting in a solution. In terms of the present invention, the solvent is not restricted to a compound or medium which dissolves the solutes in the proper sense: This compound or medium may be more generally a dispersing medium, and thus the "solution" might be a suspension, emulsion or a solution in the proper sense (i.e. a homogeneous mixture composed of two or more substances, where the particles of the solute cannot be seen by naked eye and which does not scatter light). As used above, the term "solvent" does not include any of components (i) and (a) to (e), even if these are liquid and may principally act as a solvent for one or more of the other components. As used above, this term includes only liquid substances which are different from components (i) and (a) to (e) and are able to dissolve a solute.

In a particular embodiment, the polymer composition of the invention is characterized by not containing any curing/crosslinking catalyst based on tin (e.g. the usually present dibutyltin dilaurate (DBTL) or dibutyltin dioctoate or dibutyltin diacetylacetonate) and more particularly by not containing any metal-based curing/crosslinking catalyst.

The polymer composition is prepared by principally known methods, such as intimately mixing the components, either simultaneously or consecutively, in suitable dispersing units, such as mixers, in particular high-speed mixers, planetary mixers, internal mixers, compounders, twin-screw-extruders etc.

The invention further relates to the use of the stabilizer composition of the invention for stabilizing a silyl-terminated polymer or a sealant, adhesive, gasket, knifing filler or coating composition, especially a sealant composition, adhesive composition, gasket composition, knifing filler composition or coating composition containing a silyl-terminated polymer, against degradation by heat, light and/or oxygen.

The invention also relates to the use of the polymer composition of the invention as or in a sealant composition, adhesive composition, gasket composition, knifing filler composition or coating composition.

The invention also relates to a sealant composition or an adhesive composition, or a gasket composition, or a knifing filler composition or a coating composition comprising the polymer composition of the invention.

Moreover, the invention relates to a method for stabilizing a silyl-terminated polymer or a sealant, adhesive, gasket, knifing filler or coating composition, especially a sealant, adhesive, gasket, knifing filler or coating composition containing a silyl-terminated polymer, against degradation by heat, light and/or oxygen.

Adhesive and sealant are partly overlapping terms.

Sealants are substances used to block the passage of fluids through the surface or joints or openings in materials. They have to show adhesion to the substrates which they are to seal, but more importantly they have to have a strong cohesion. Cohesion is the property of a substance to stick together, i.e. its inner force.

Adhesives are substances that bind together substrates and resist their separation. Adhesive interactions are here of more importance than cohesive forces, although without cohesion an adhesive can not work, either.

Some applications for the sealant and adhesive compositions of the present invention are for example deck bonding and sealing, port holes sealing, cables sealing, glazing, windows sealing, bathroom water-barrier sealing and adhesing or sealing of flooring, especially of parquet.

The stabilizer composition of the invention effectively stabilizes curable compositions, and especially provides a good long-term temperature and/or UV and/or oxidation stability after curing, and at the same time avoids negative interactions of the components. Moreover, due to the specific plasticizer, the exudation of components of the stabilizer composition from cured polymers, especially of components (b) from cured STPs, is avoided.

The invention is now illustrated by the following examples.

Examples

Materials Used:

| | |
|---|---|
| Geniosil ® STP-E 35: | a trimethoxysilylpropylcarbamate-terminated polyether polymer from Wacker |
| Geniosil ® STP-E 10: | a dimethoxy(methyl)silylmethylcarbamate-terminated polyether polymer from Wacker |
| Tinuvin ® 123 | a HALS amine; compound of formula II.1; from BASF SE |
| Tinuvin ® 249 | a HALS amine; compound of formula I.1; from BASF SE |
| Tinuvin ® 292 | a HALS amine in which the nitrogen atom of the piperidine ring carries a methyl group; not according to light stabilizers (a) of the invention; from BASF SE |
| Irganox ® 1520 | an antioxidant (4,6-bis(octylthiomethyl)-o-cresol; compound of formula IV.1 with $R^{16}$ = octyl); from BASF SE |
| Irganox ® 1135 | phenolic antioxidant without thioether groups; not according to antioxidants (b) of the invention; from BASF SE |
| Joncryl ® 1200 | polybutylacrylate; plasticizer according to component (c) of the invention containing 2 to 3% by weight, based on the total weight of the polymer, of acrylic acid in copolymerized form; from BASF SE |
| Joncryl ® 963 | polybutylacrylate copolymer containing 2 to 3% by weight, based on the total weight of the polymer, of acrylic acid in copolymerized form; plasticizer according to component (c) of the invention; from BASF SE |
| Hexamoll ® DINCH | 1,2-cyclohexane dicarboxylic acid diisononyl ester; plasticizer according to component (c) of the invention; from BASF SE |
| Loxanol ® PL 5060 | polypropyleneglycol alkylphenylether, CAS no. 9064-13-5; plasticizer; not according to component (c) of the invention |
| Efka ® RM 1920 | hydrogenated castor oil; rheology modifier (thickener) from BASF SE |
| PLB1 | photolatent base of formula PLB.1 (s = 1, $R^{18}$ = methoxycarbonyl bound in para-position, $R^{19}$ = H) yielding DBN (1,5-diazabicyclo[4.3.0]non-5-ene) upon activation |
| Irgacure ® 369 | photolatent base; 2-benzyl-2-dimethylamino-1-(4-morpholino-phenyl)-butanone-1; compound of formula PLB.6; from BASF |
| DBU | 1,8-diazabicyclo[5.4.0]undec-7-ene; catalyst |
| DBTL | dibutyltindilaurate; catalyst |
| $CaCO_3$ | applied as Omyacarb ® 2GU Powder from Omya; used as filler |

Compositions

The compositions were prepared by intimately mixing the components with a Speed Mixer DAC 400 FVZ from Hauschild Engineering, Germany, in the relative amounts given in the following tables. The amounts are given in parts by weight.

Test Methods

Color was evaluated by Gardner color number index according to ASTM D-6166. Higher numbers mean higher color, i.e. higher oxidation.

Where a more precise differentiation than possible with determination of the Gardner color number index according to ASTM D-6166 was desired, the measurement was performed with a Byk Spectro Guide (CIE Lab Color system).

The viscosities were measured using a CAP 2000+ Viscometer (Brookfield) according DIN EN ISO 3219, annex B at a shear rate of 100 s$^{-1}$.

Mechanical strength data were taken according to DIN EN 1465 with a tensile strength tester from Zwick Roell/Z010.

UV-aging was measured in a Suntester (Atlas instruments) with a wavelength of 300 to 400 nm.

The UV cure experiments were carried out in an UV Tunnel (type M-40-2×1-TR-CMK-SLC with two lamps of the type M 400 U2L/LA (UV range of from 180 to 450 nm) from IST METZ GmbH, Germany The UV dose from repeated exposures were measured with a UV Power-Puck® II from EIT Instrument Markets, EIT Inc.

Shore A Hardness was determined according to DIN 53505 using a shore scale A durometer.

Thermal aging was conducted in a ventilated oven (Heraeus® Thermicon P)

Tests

1.) Mechanical Tests and Gardner Color Test a) Use of Joncryl® 1200 as plasticizer

| Components | Null 1 | Null 2 | Cmp. 1 | Cmp. 2 | Cmp. 3 | Inv. |
|---|---|---|---|---|---|---|
| Geniosil ® STP-E 35 | 35 | 35 | 35 | 35 | 35 | 35 |
| Joncryl ® 1200 | 0 | 10 | 10 | 10 | 10 | 10 |
| $CaCO_3$ | 45 | 45 | 45 | 45 | 45 | 45 |
| Tinuvin ® 249 | 0 | 0 | 0 | 0.5 | 0 | 0.5 |
| Tinuvin ® 292 | 0 | 0 | 0.5 | 0 | 0.5 | 0 |
| Irganox ® 1135 | 0 | 0 | 0.5 | 0.5 | 0 | 0 |
| Irganox ® 1520L | 0 | 0 | 0 | 0 | 0.5 | 0.5 |
| DBTL | 0.05 | 0.05 | 0.05 | 0.05 | 0.05 | 0.05 |
| Elongation at break % before aging | 243.12 | 223.92 | 151.71 | 176.12 | 192.77 | 145.13 |
| Elongation at break % after 5 d at 130° C. | n.d. | n.d. | 415.81 | 351.97 | 322.68 | 122.69 |
| F (max) N/mm before aging | 1.14 | 1.25 | 1.17 | 1.22 | 1.23 | 1.16 |
| F (max) after 5 d at 130° C. | n.d. | n.d. | 0.83 | 0.68 | 1.04 | 1.1 |
| Color b* before aging | 3.35 | 3.21 | 3.2 | 3.36 | 3.17 | 3.24 |
| Color b* after 5 d at 130° C. | n.d. | n.d. | 9.43 | 7.65 | 7.04 | 6.51 |
| Appearance after 5 d at 130° C. | cracks | cracks | solid, smooth | edge liquid | solid, smooth | solid, smooth |

Null 1 = test without additives and without plasticizer
Null 2 = test without additives
Cmp. 1, 2, 3 = comparative examples
Inv. = example according to the invention
*Color b is the b value of a colorimetric measurement performed with a Byk Spectro Guide (CIE Lab Color system)
Cracks: the films were actually completely decomposed. Further measurements were not possible.

b) Use of Hexamoll® DINCH as plasticizer

| Components | Null 1 | Null 2 | Cmp. 1 | Cmp. 2 | Cmp. 3 | Inv. |
|---|---|---|---|---|---|---|
| Geniosil ® STP-E 35 | 35 | 35 | 35 | 35 | 35 | 35 |

-continued

| Components | Null 1 | Null 2 | Cmp. 1 | Cmp. 2 | Cmp. 3 | Inv. |
|---|---|---|---|---|---|---|
| Hexamoll ® DINCH | 0 | 10 | 10 | 10 | 10 | 10 |
| CaCO₃ | 45 | 45 | 45 | 45 | 45 | 45 |
| Tinuvin ® 249 | 0 | 0 | 0 | 0.5 | 0 | 0.5 |
| Tinuvin ® 292 | 0 | 0 | 0.5 | 0 | 0.5 | 0 |
| Irganox ® 1135 | 0 | 0 | 0.5 | 0.5 | 0 | 0 |
| Irganox ® 1520L | 0 | 0 | 0 | 0 | 0.5 | 0.5 |
| DBTL | 0.05 | 0.05 | 0.05 | 0.05 | 0.05 | 0.05 |
| Elongation at break % before aging | 243.12 | 223.92 | 147.93 | 145.77 | 223.17 | 153.59 |
| Elongation at break % after 5 d at 130° C. | n.d. | n.d. | 288.25 | 241.12 | n.d.* | 137.39 |
| F (max) N/mm before aging | 1.14 | 1.25 | 1.34 | 1.31 | 1.34 | 1.33 |
| F (max) after 5 d at 130° C. | n.d. | n.d. | 1.1 | 0.91 | 0.82 | 1.32 |
| Color b* before aging | 3.35 | 3.21 | 3.16 | 3.25 | 3.24 | 3.18 |
| Color b* after 5 d at 130° C. | n.d. | n.d. | 8.8 | 8.36 | 7.76 | 6.63 |
| Appearance after 5 d at 130° C. | cracks | cracks | solid, smooth | edge liquid | solid, smooth | solid, smooth |

Null 1 = test without additives and without plasticizer
Null 2 = test without additives
Cmp. 1, 2, 3 = comparative examples
Inv. = example according to the invention
*Color b is the b value of a colorimetric measurement performed with a Byk Spectro Guide (CIE Lab Color system)
Cracks: the films were actually completely decomposed. Further measurements were not possible, therefore n.d. (not determined).
n.d.*: experiment could not be evaluated because paper stuck to the film.

c) Use of combination of HALS amines

| Components | Null | Cmp. | Inv. |
|---|---|---|---|
| Geniosil ® STP-E 35 | 35 | 35 | 35 |
| Joncryl ® 1200 | 10 | 10 | 10 |
| CaCO₃ | 45 | 45 | 45 |
| Tinuvin ® 123 | — | 0.2 | 0.2 |
| Tinuvin ® 249 | — | 0.3 | 0.3 |
| Tinuvin ® 292 | — | — | — |
| Irganox ® 1135 | — | 0.5 | — |
| Irganox ® 1520L | — | — | 0.5 |
| DBTL | 0.05 | 0.05 | 0.05 |
| Appearance after 1 day at 130° C. aging | liq. | sol. | sol. |
| Gardner color after 1 day at 130° C. | 9 | n.a. | 1 |
| F (max) N/mm before aging | n.a. | 1.51 | 1.38 |
| F (max) N/mm after 5 days at 130° C. aging | n.a. | 0.9 | 1.3 |
| Retained mechanical stability after 5 days at 130° C. aging | n.a. | 60% | 94% |

Null = test without additives
Cmp. = comparative example
Inv. = example according to the invention
liq. = liquid
sol. = solid 2.) Experiments for Photo-Initiation of Formulated STP-Systems.

| Components | Null | Cmp. | Inv. | Cmp. | Inv. | Cmp. |
|---|---|---|---|---|---|---|
| Geniosil ® STP-E35 | 100 | 100 | 100 | 100 | 100 | 100 |
| Joncryl ® 963 | — | — | 25 | — | 25 | — |
| Efka ® RM 1920 | 6.0 | 6.0 | 2.0 | 2.0 | 2.0 | 2.0 |
| PLB 1 | — | — | — | 0.1 | 0.1 | — |
| Irgacure ® 369 | — | 1.0 | 1.0 | — | — | — |
| Irganox ® 1520L | — | — | 0.5 | — | 0.5 | — |

-continued

| Components | Null | Cmp. | Inv. | Cmp. | Inv. | Cmp. |
|---|---|---|---|---|---|---|
| Tinuvin ® 249 | — | — | 0.5 | — | 0.5 | — |
| DBU | — | — | — | — | — | 1.0 |
| Hardening dark | n.c. | n.c. | n.c. | n.c. | n.c. | 1 h |
| light exposure with 4726 mJ/cm² | n.c. | 176 h | 176 h | 76 h | 76 h | 1 h |

Null = test without additives
Cmp. = comparative example
Inv. = example according to the invention
n.c. = not cured 3.) Thermic Stabilization of STPs

| Components | Null | Cmp. | Inv. | Cmp. | Cmp. |
|---|---|---|---|---|---|
| Geniosil ® STP-E 35 | 45 | 45 | 45 | 45 | 45 |
| Joncryl ® 1200 | 10 | 10 | 10 | 10 | 10 |
| CaCO₃ | 45 | 45 | 45 | 45 | 45 |
| Tinuvin ® 249 | 0 | 0.5 | 0.5 | 0 | 0 |
| Tinuvin ® 292 | 0 | 0 | 0 | 0.5 | 0.5 |
| Irganox ® 1135 | 0 | 0.5 | 0 | 0.5 | 0 |
| Irganox ® 1520 | 0 | 0 | 0.5 | 0 | 0.5 |
| DBTL | 0.1 | 0.1 | 0.1 | 0.1 | 0.1 |
| Shore A hardness before aging | 43 | 43 | 42 | 41 | 42 |
| Thermal aging 5 d at 130° C. | | | | | |
| Shore A hardness after aging | 3 | 5 | 27 | 7 | 18 |
| Shore A hardness delta [%] | 93% | 88% | 36% | 83% | 57% |
| Gardner color after aging | 6 | 3 | 2 | 3 | 3 |
| Appearance after aging | cracks | solid, smooth | solid, smooth | solid, smooth | solid, smooth |

Null = test without additives
Cmp. = comparative example
Inv. = example according to the invention 4) Gardner Color Test with Different Plasticizers

| Components | Inv. 1 | Inv. 2 | Inv. 3 | Comp. |
|---|---|---|---|---|
| Tinuvin ® 123 | 0.2 | 0.2 | 0.2 | 0.2 |
| Tinuvin ® 249 | 0.3 | 0.3 | 0.3 | 0.3 |
| Tinuvin ® 292 | 0 | 0 | 0 | 0 |
| Irganox ® 1135 | 0 | 0 | 0 | 0 |
| Irganox ® 1520L | 0.5 | 0.5 | 0.5 | 0.5 |
| Joncryl ® 1200 | 10 | 0 | 0 | 0 |
| Joncryl ® 963 | 0 | 10 | 0 | 0 |
| Hexamoll ® DINCH | 0 | 0 | 10 | 0 |
| Loxanol ® PL 5060 | 0 | 0 | 0 | 10 |
| Gardner Color after 5 d at 130° C. | 2 | 2 | 2 | 3 |

Inv. = example according to the invention
Cmp. = comparative example

We claim:

1. A stabilizer composition, comprising:
   (a) a light stabilizer comprising a sterically hindered amine (HALS) in which the amino group carries a basicity-reducing substituent;
   (b) an antioxidant comprising a thioether group;
   (c) a plasticizer which is liquid at 25° C. and comprises a carboxylate group;
   (d) optionally, a UV absorber; and
   (e) optionally, a photolatent or thermally latent initiator,
   wherein the sterically hindered amine comprises a compound of formula (I), (II), and/or (III)

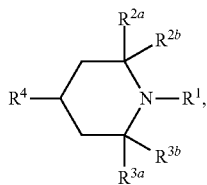

(I)

wherein, in formula (I), $R^1$ is independently -A-C(=X)—$R^5$ or —$OR^6$, $R^{2a}$, $R^{2b}$, $R^{3a}$, and $R^{3b}$ are independently $C_1$-$C_3$-alkyl, $R^4$ is H, —$OR^8$, —$S(O)_mR^9$, —$NR^{10a}R^{10b}$, —C(=O)$R^{11}$, or —C(=S)$R^{11}$, or $C_1$-$C_{12}$-alkyl optionally comprising a substituent $R^7$, $R^5$ is —$OR^8$, —$NR^{10a}R^{10b}$ or $C_1$-$C_{12}$-alkyl optionally comprising a substituent $R^7$, $R^6$ is $C_1$-$C_{12}$-alkyl optionally comprising a substituent $R^7$, or —C(=O)—$C_1$-$C_8$-alkyl, the alkyl optionally comprising a substituent $R^7$, $R^7$ is independently —Si($R^{12}$)$_3$, —$OR^8$, —$OSO_2R^8$, —$S(O)_mR^9$, —N($R^{10a}$)$R^{10b}$, —C(=O)N($R^{10a}$)$R^{10b}$, —C(=S)N($R^{10a}$)$R^{10b}$, —C(=O)$OR^8$, —CH=$NOR^8$, $C_3$-$C_6$-cycloalkyl optionally comprising a substituent $R^{13}$, phenyl optionally substituted with 1, 2, 3, 4, or 5 substituents $R^{13}$, or a 3-, 4-, 5-, 6-, or 7-membered saturated, partially unsaturated, or maximally unsaturated heterocyclic ring comprising 1, 2, or 3 heteroatoms or heteroatom groups selected from the group consisting of N, O, S, NO, SO, and $SO_2$, as ring members, the heterocyclic ring optionally comprising a substituent $R^{13}$;

$R^8$ is H, $C_1$-$C_{12}$-alkyl optionally comprising a substituent $R^{14}$, or —C(=O)—$C_1$-$C_{12}$-alkyl, the alkyl moiety optionally comprising a substituent $R^{14}$, $R^9$ is independently H, $C_1$-$C_{12}$-alkyl optionally comprising a substituent $R^{14}$, or $C_1$-$C_{12}$-alkoxy, $R^{10a}$ and $R^{10b}$ are independently H, $C_1$-$C_{12}$-alkyl optionally comprising a substituent $R^{14}$, or $C_1$-$C_{12}$-alkoxy, $R^{11}$ is independently H, $C_1$-$C_{12}$-alkyl optionally comprising a substituent $R^{14}$, or $C_1$-$C_{12}$-alkoxy, $R^{12}$ is independently $C_1$-$C_{12}$-alkyl optionally comprising a substituent $R^{14}$ or $C_1$-$C_{12}$-alkoxy, $R^{13}$ is independently OH, cyano, $C_1$-$C_4$-alkyl, or $C_1$-$C_4$-alkoxy, or two $R^{13}$ bound on the same carbon atom of a cycloalkyl ring or a heterocyclic ring may form together a group =O, $R^{14}$ is independently of —Si($R^{15}$)$_3$, hydroxyl, cyano, $C_1$-$C_{12}$-alkoxy, amino, $C_1$-$C_4$-alkylamino, di-($C_1$-$C_4$-alkyl)-amino, aminocarbonyl, $C_1$-$C_4$-alkylaminocarbonyl, di($C_1$-$C_4$-alkyl)-aminocarbonyl, $C_1$-$C_4$-alkylcarbonyl, $C_1$-$C_4$-alkoxycarbonyl, $C_3$-$C_6$-cycloalkyl optionally substituted with 1, 2, 3, 4, or 5 substituents $R^{13}$, phenyl optionally substituted with 1, 2, 3, 4, or 5 substituents $R^{13}$, or a 3-, 4-, 5-, 6-, or 7-membered saturated, partially unsaturated, or maximally unsaturated heterocyclic ring comprising 1, 2, or 3 heteroatoms or heteroatom groups selected from the group consisting of N, O, S, NO, SO, and $SO_2$, as ring members, the heterocyclic ring optionally comprising a substituent $R^{13}$, $R^{15}$ is independently $C_1$-$C_{12}$-alkyl or $C_1$-$C_{12}$-alkoxy, A is —$(CH_2)_n$— or —$(CH_2)_p$—O—, where O is bound to C(=X), X is O or S, m is 0, 1 or 2, n is 3 or 4, and p is 2 or 3, and

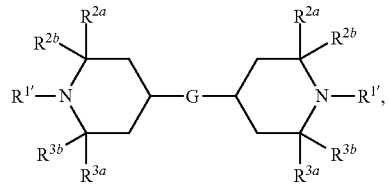

(II)

wherein, in formula (II), $R^{1'}$ has independently one of the meanings given above for $R^1$, $R^{2a}$, $R^{2b}$, $R^{3a}$, and $R^{3b}$ are independently as defined above, and G is $C_1$-$C_{10}$-alkylene, —O—$C_2$-$C_{10}$-alkylene-O—, —C(=O)—$C_1$-$C_{10}$-alkylene-C(=O)—, or —O—C(=O)—$C_1$-$C_{10}$-alkylene-C(=O)—O—, and

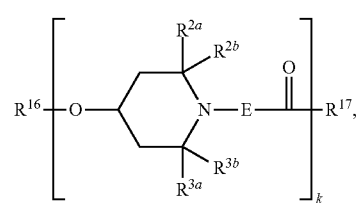

(III)

wherein, in formula (III), $R^{2a}$, $R^{2b}$, $R^{3a}$, and $R^{3b}$ are independently as defined above, E is —$(CH_2)_n$—, —$(CH_2)_p$—O— where O is bound to C(=O), —$(CH_2)_n$—C(=O)-$E^1$-, or —$(CH_2)_p$—O—C(=O)-$E^1$-, where n and p are as defined above and $E^1$ is linear or branched $C_1$-$C_{10}$-alkylene, $R^{16}$ is H or $C_1$-$C_4$-alkyl, $R^{17}$ is H, $C_1$-$C_4$-alkyl, or $C_1$-$C_4$-alkoxy, and k is in a range of from 2 to 50, and wherein the plasticizer comprises an acrylate polymer optionally comprising, in polymerized form, a methacrylate or non-polymeric plasticizer comprising an aromatic carboxylate, aliphatic carboxylate, or cycloaliphatic carboxylate, and wherein the basicity-reducing substituent is a substituent which reduces the electron density on the nitrogen atom of the amino group.

2. The composition of claim 1, wherein the sterically hindered amine comprises the compound of formula (I), wherein $R^1$ is —$(CH_2)_2$—O—C(=O)—$R^5$, $R^5$ being 2,4,4-trimethylpentyl, $R^{2a}$, $R^{2b}$, $R^{3a}$, and $R^{3b}$ are methyl, and $R^4$ is —O—C(=O)-(2,4,4-trimethylpentyl).

3. The composition of claim 1, wherein the sterically hindered amine comprises the compound of formula (II) and/or the compound of formula (III), wherein, in formula (II), $R^{1'}$ is independently —$OR^6$, $R^6$ being $C_4$-$C_{12}$-alkyl, and G is —O—C(=O)—$C_6$-$C_{10}$-alkylene-C(=O)—O—; and wherein, in formula (III), E is —$(CH_2)_2$—O—C(=O)-$E^1$-, $E^1$ being linear or branched $C_2$-$C_4$-alkylene, $R^{16}$ is H,
$R^{17}$ is $C_1$-$C_4$-alkoxy, and
k is in a range of from 8 to 20.

4. The composition of claim 1, wherein the sterically hindered amine comprises
the compound of formula (I), and additionally
the compound of formula (II), and/or the compound of formula (III).

5. The composition of claim 1, wherein the sterically hindered amine comprises a compound of formula (I.1)

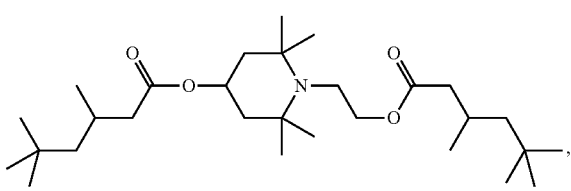

(I.1)

and optionally also a compound of formula (II.1)

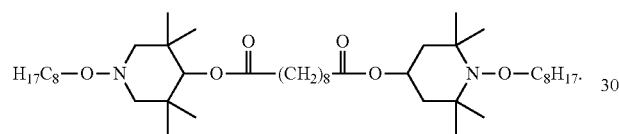

(II.1)

6. The composition of claim 1, wherein the antioxidant is a hydroxyaromatic compound comprising a thioether group.

7. The composition of claim 6, wherein the antioxidant is of formula (IV)

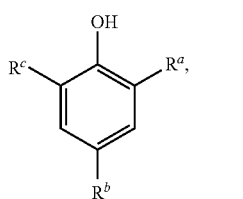

(IV)

wherein
$R^a$, $R^b$ and $R^c$ are independently $C_1$-$C_4$-alkyl optionally comprising —$SR^{16}$;
with the proviso that at least one of $R^a$, $R^b$, and $R^c$ is $C_1$-$C_4$-alkyl comprising —$SR^{16}$, $R^{16}$ being $C_1$-$C_{16}$-alkyl.

8. The composition of claim 7, wherein
$R^a$ and $R^b$ are —$CH_2$—$SR^{16}$, $R^{16}$ being n-octyl or n-dodecyl, and
$R^c$ is methyl.

9. The composition of claim 1, wherein the plasticizer comprises an acrylate polymer with a weight-average molecular weight of at most 30000, a glass transition temperature of at most −40° C., and a viscosity of at most 250 Pa·s at 25° C.

10. The composition of claim 9, where the plasticizer comprises a polyacrylate comprising a repeating unit of formula

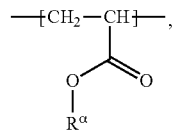

wherein
$R^\alpha$ is independently $C_1$-$C_6$-alkyl optionally carrying one OH or $C_1$-$C_4$-alkoxy,
wherein the polyacrylate optionally comprises 2 to 3 wt. %, based on total polymer weight, of acrylic acid in copolymerized form.

11. The composition of claim 1, wherein the plasticizer comprises a 1,2-cyclohexane dicarboxylic acid di-($C_4$-$C_{20}$-alkyl) ester.

12. The composition of claim 1, wherein the composition comprises the UV absorber as a triazine UV absorber of formula (VI)

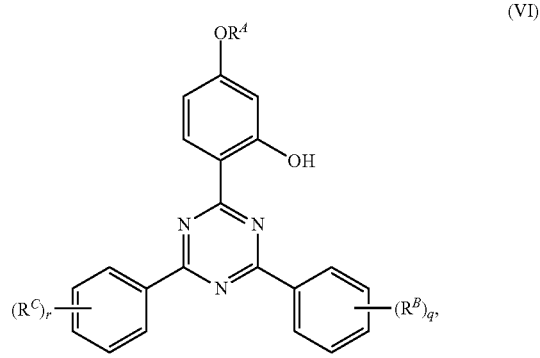

(VI)

wherein
$R^A$ is H or $C_1$-$C_{12}$-alkyl optionally comprising a substituent $R^{17}$;
$R^B$ and $R^C$ are independently OH, $C_1$-$C_{12}$-alkyl optionally comprising a substituent $R^{17}$, or $C_1$-$C_{12}$-alkoxy optionally comprising, on the alkyl moiety in the alkoxy, a substituent $R^{17}$,
$R^{17}$ is OH or $C_1$-$C_{20}$-alkoxy, and
q and r are independently 0, 1, or 2.

13. The composition of claim 12, wherein
$R^A$ is —$CH_2$—CH(OH)—$CH_2$—O—$C_nH_{2n+1}$, where n is in a range of from 12 to 14,
$R^B$ and $R^C$ are methyl, and
q and r are 2.

14. The composition of claim 1, comprising the photolatent or thermically latent initiator,
wherein the photolatent or thermically latent initiator comprises a photolatent base, photolatent metal-based initiator, or thermally latent metal-based initiator.

15. The composition of claim 14, wherein
the photolatent base comprises a compound $B^1$—$Z^1$, $B^1$ and $Z^1$ being covalently bound,
wherein $B^1$ comprises an amidine, guanidine, or secondary amine,
wherein $Z^1$ is a photolytically removable group, and
wherein the metal-based initiator comprises a titanium complex comprising a photolytically or thermally removable ligand or an aluminum complex comprising a photolytically or thermally removable ligand.

16. The composition of claim 15, wherein the photolatent base comprises a compound of formula PLB.1 to PLB.7:

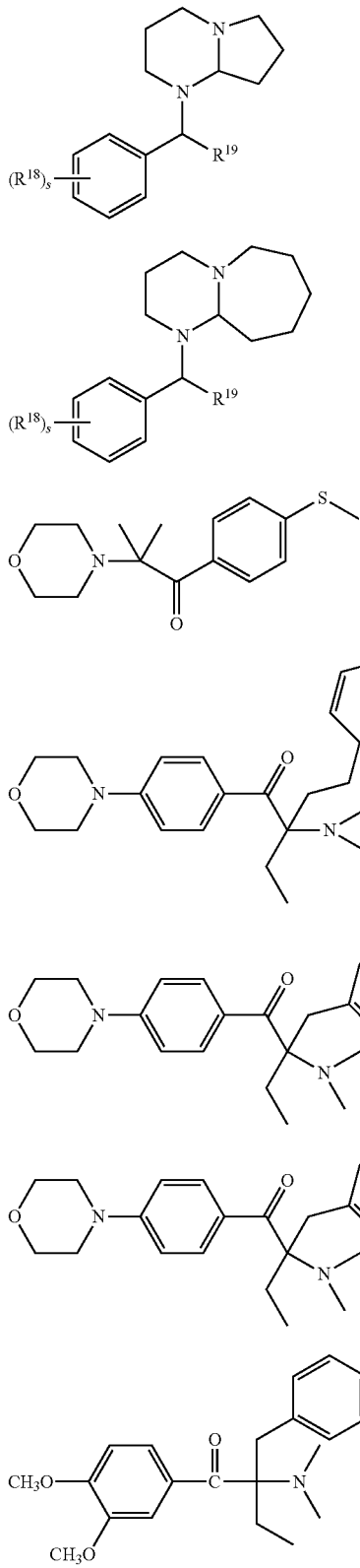

wherein, in any of PLB.1 to PLB.7, $R^{18}$ is independently $C_1$-$C_6$-alkyl, $C_1$-$C_6$-alkoxy, $C_1$-$C_6$-alkylthio, $C_1$-$C_6$-alkylsulfinyl, $C_1$-$C_6$-alkylsulfonyl, $C_1$-$C_6$-alkylcarbonyl, or $C_1$-$C_6$-alkoxycarbonyl, $R^{19}$ is H or $C_1$-$C_4$-alkyl, and s is 0, 1, 2, 3, 4, or 5.

17. The composition of claim 16, wherein the photolatent base comprises a compound of formula PLB.1, PLB.2, PLB.4, PLB.5, PLB.6, or PLB.7.

18. The composition of claim 1, comprising
(a) the light stabilizer in a range of from 0.1 to 10 wt. %;
(b) the antioxidant in a range of from 0.1 to 10 wt. %;
(c) the plasticizer in a range of from 10 to 99.8 wt. %;
(d) the UV absorber in a range of from 0 to 10 wt. %;
(e) the photolatent or thermally latent initiator in a range of from 0 to 5 wt. %; and
(f) a further additive in a range of from 0 to 89.8 wt. %;
wherein the percentages by weight are based on total stabilizer composition weight and the weights from (a) to (f) add up to 100 wt. %.

19. The composition of claim 1, which is liquid at 25° C. and 1013 mbar and comprises at most 5 wt. %, based on total stabilizer composition weight, of solvents.

20. A polymer composition, comprising
(i) a silyl-terminated polymer; and
(ii) the stabilizer composition of claim 1.

21. The polymer composition of claim 20, where the silyl-terminated polymer is a polymer of formula (VI)

$$[(R')_a(R''O)_{3-a}Si\text{-}L^1\text{-}Y]_b\text{—Po} \qquad (VI),$$

wherein
Po is the divalent, trivalent, or tetravalent radical of a base polymer selected from the group consisting of polyethers, polyesters, polyamides, polyimines, polyurethanes, poly(meth)acrylates, polyvinylesters, polyolefins, and mixed forms thereof,
Y is independently a bond, —NH—C(=O)—O—, —O—C(=O)—NH—, —C(=O)—NH-$L^2$-NH—C(=O)—NH—, —NH—C(=O)—NH-$L^2$-NH—C(=O)—, —O—C(=O)—, —C(=O)—O—, —NH—C(=O)—S—, —S—C(=O)—NH—, or —O—,
R' and R" are independently $C_1$-$C_6$-alkyl,
$L^1$ is $C_1$-$C_3$-alkylene,
$L^2$ is a divalent aliphatic, cycloaliphatic, or aromatic radical,
a is independently 0 or 1, and
b is 2, 3, or 4.

22. The polymer composition of claim 21, wherein Po is the divalent radical of a polyether, and
wherein the polyether is a polyethylene glycol or polypropylene glycol.

23. The polymer composition of claim 21, wherein
Y is —NH—C(=O)—O—, NH being bound to $L^1$,
R' and R" are independently methyl or ethyl, and
$L^1$ is independently —$CH_2$— or —$CH_2CH_2CH_2$—.

24. The polymer composition of claim 20, which is liquid at 25° C. and 1013 mbar and comprises at most 5 wt. %, based on total polymer composition weight, of solvents.

25. The polymer composition of claim 20, comprising:
(i) the silyl-terminated polymer in a range of from 10 to 94.9 wt. %;
(a) the light stabilizer in a range of from 0.05 to 10 wt. %;
(b) the antioxidant in a range of from 0.05 to 10 wt. %;
(c) the plasticizer in a range of from 5 to 89.9 wt. %;
(d) at least one UV absorber in a range of from 0 to 10 wt. %;
(e) the photolatent or thermally latent initiator in a range of from 0 to 5 wt. %; and (f) a further additive in a range of from 0 to 84.9 wt. %, wherein the percentages by weight are based on total polymer composition weight and the weights of (i) and (a) to (f) add up to 100 wt. %.

26. A sealant, adhesive, liquid gasket, knifing filler, or coating composition, comprising the polymer composition of claim 20.

* * * * *